US012697823B2

(12) United States Patent
Zensai et al.

(10) Patent No.: US 12,697,823 B2
(45) Date of Patent: Aug. 4, 2026

(54) PRINTING APPARATUS AND PRINTING METHOD

(71) Applicant: CANON KABUSHIKI KAISHA, Tokyo (JP)

(72) Inventors: Shoichi Zensai, Kanagawa (JP); Yusuke Nakaya, Tokyo (JP); Yohei Kusano, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 144 days.

(21) Appl. No.: 18/826,537

(22) Filed: Sep. 6, 2024

(65) Prior Publication Data

US 2025/0091363 A1 Mar. 20, 2025

(30) Foreign Application Priority Data

Sep. 15, 2023 (JP) ................................. 2023-149835

(51) Int. Cl.

| | |
|---|---|
| ***B41J 11/00*** | (2006.01) |
| ***B41J 29/377*** | (2006.01) |
| ***B41M 7/00*** | (2006.01) |
| *G03G 15/20* | (2006.01) |
| *G03G 21/20* | (2006.01) |

(52) U.S. Cl.

CPC ....... *B41J 11/00222* (2021.01); *B41J 29/377* (2013.01); *B41M 7/009* (2013.01); *B41J 11/00212* (2021.01); *B41J 11/00224* (2021.01); *G03G 15/2017* (2013.01); *G03G 21/206* (2013.01)

(58) Field of Classification Search

CPC ................ B41J 11/00222; B41J 29/377; B41J 11/00212; B41J 11/00224; B41M 7/009; G03G 15/2017; G03G 21/206

See application file for complete search history.

(56) References Cited

U.S. PATENT DOCUMENTS

| | | | |
|---|---|---|---|
| 8,434,849 | B2 | 5/2013 | Kurasawa |
| 9,248,666 | B2 | 2/2016 | Fuchioka |
| 10,493,782 | B2 | 12/2019 | Sato |
| 10,500,839 | B2 | 12/2019 | Sato |
| 11,571,916 | B2 | 2/2023 | Sato |
| 12,157,298 | B2 | 12/2024 | Nakaya |
| 2011/0063358 | A1 | 3/2011 | Muro |

(Continued)

FOREIGN PATENT DOCUMENTS

| | | | |
|---|---|---|---|
| JP | 2011-224932 | A | 11/2011 |
| JP | 2013-166258 | A | 8/2013 |
| JP | 2021-067395 | A | 4/2021 |

OTHER PUBLICATIONS

Feb. 14, 2025 European Official Action in European Patent Appln. No. 24200208.7.

*Primary Examiner* — Henok D Legesse

(74) *Attorney, Agent, or Firm* — Venable LLP

(57) ABSTRACT

A printing apparatus includes a dryer unit including an intake port, a heater unit to heat outside air taken in through the intake port, an air blower unit to perform an air blowing operation, a return port to allow an inflow of part of the heated outside air blown to the print sheet, and a temperature detector unit to detect a temperature inside the dryer unit. In the air blowing operation, the returned part of the heated outside air and the outside air flow into the air blower unit. A controller unit controls the air blowing operation or the output of the heater unit.

19 Claims, 12 Drawing Sheets

(56) References Cited

U.S. PATENT DOCUMENTS

| | | | | |
|---|---|---|---|---|
| 2011/0261102 | A1 | 10/2011 | Kurasawa | |
| 2016/0152047 | A1* | 6/2016 | Houjou | B41J 11/0022 347/16 |
| 2016/0167403 | A1 | 6/2016 | Toya | |
| 2018/0264803 | A1* | 9/2018 | Hoshino | B41J 15/08 |
| 2021/0122171 | A1* | 4/2021 | Yamada | B41J 11/00222 |
| 2022/0402278 | A1* | 12/2022 | Maida | B41J 11/0022 |
| 2024/0343048 | A1 | 10/2024 | Nakaya | |
| 2024/0351352 | A1 | 10/2024 | Kusano | |
| 2025/0001770 | A1 | 1/2025 | Nakaya | |

* cited by examiner

PRINTING APPARATUS AND PRINTING METHOD

BACKGROUND OF THE INVENTION

Field of the Invention

The present disclosure relates to a printing apparatus and a printing method.

Description of the Related Art

Among printing apparatuses, for example, an inkjet printing apparatus having a print head has been known. The inkjet printing apparatus ejects inks from ejection ports of the print head. The inkjet printing apparatus ejects the inks to, for example, a print medium such as roll paper or a cut sheet. Japanese Patent Laid-Open No. 2011-224932 discloses such an inkjet printing apparatus including a unit configured to dry inks ejected on a print medium (hereinafter, referred to as Document 1). This unit includes a heater configured to heat air, a fan configured to circulate the air heated by the heater as hot air, a motor attached to a shaft of the fan, and a control board configured to drive and rotate the motor. Document 1 discloses a technique for drying a print medium by raising the temperature of the heater to create a high-temperature environment inside the unit. In the technique of Document 1, an ink drying efficiency may be further improved if a greater volume of hot air is applied to the print medium as the rotation speed of the fan is increased.

Various components such as a bearing that supports the shaft of the fan and electronic components on the control board are not designed to be used in an environment hotter than their heat-resistant temperature. However, in the technique of Document 1, the hot air temperature is controlled without taking the heat-resistant temperature of the fan into consideration.

SUMMARY OF THE INVENTION

The present disclosure in an aspect provides a printing apparatus that includes: an image formation unit configured to form an image on a print sheet; a dryer unit provided on a subsequent stage side of the image formation unit and configured to dry the print sheet on which the image is formed by the image formation unit; and a controller unit configured to control an operation of the dryer unit. The dryer unit includes: an intake port configured to take in outside air; a heater unit configured to heat the outside air taken in through the intake port; an air blower unit configured to perform an air blowing operation of blowing heated outside air in a certain direction, the heated outside air being the outside air heated by the heater unit; a return port configured to allow an inflow of part of the heated outside air blown to the print sheet; and a temperature detector unit provided inside the dryer unit and configured to detect a temperature inside the dryer unit. In a case where the air blower unit performs the air blowing operation, the part of the heated outside air flowing in through the return port and the outside air flowing in through the intake port flow into the air blower unit. In a case where the temperature detected by the temperature detector unit is equal to or higher than a first temperature, the controller unit controls the air blowing operation to increase a volume of the outside air flowing into the air blower unit. In a case where the temperature is lower than the first temperature and is equal to or higher than a second temperature lower than the first temperature, the controller unit performs control to decrease an output of the heater unit. In a case where the temperature is lower than the second temperature, the controller unit performs control to increase the output of the heater unit.

Further features of the present invention will become apparent from the following description of exemplary embodiments with reference to the attached drawings.

DESCRIPTION OF THE EMBODIMENTS

Hereinafter, preferred embodiments of the present disclosure will be described in detail in reference to the accompanying drawings. The following embodiments are not intended to limit the matters disclosed herein. In addition, all the combinations of features described in the following embodiments are not necessarily essential for the solution of the present disclosure. Herein, the same constituent elements will be designated with the same reference sign.

First Embodiment

Figure 1:
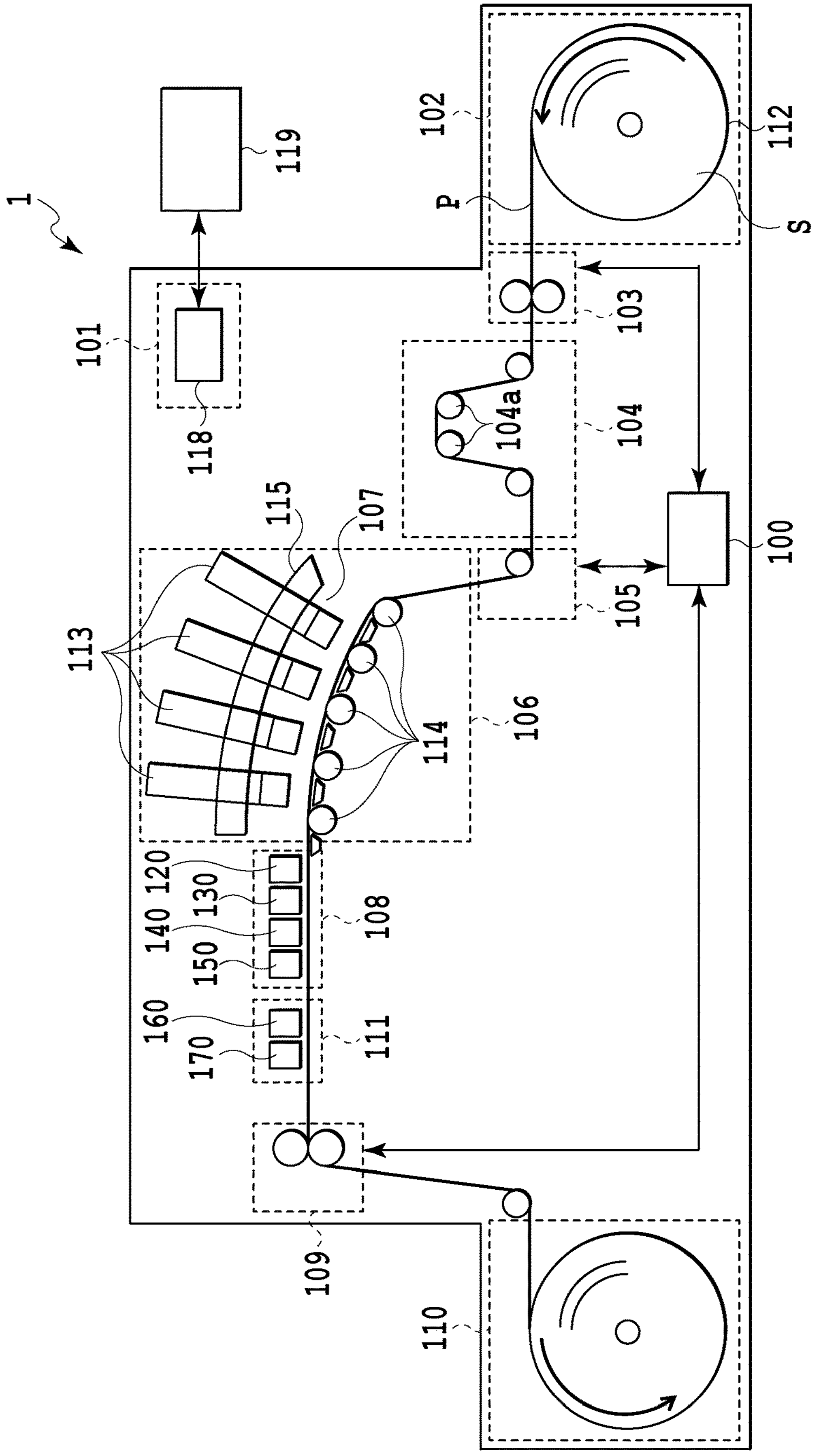
FIG. 1 is a schematic cross-sectional view illustrating an example of a structure of a printing apparatus.

FIG. 1 is a schematic cross-sectional view illustrating an example of a structure of a printing apparatus 1. In the present embodiment, a top side of the page in FIG. 1 is referred to as an upper side, a bottom side of the page in FIG. 1 is referred to as a lower side, a right-to-left direction in the page in FIG. 1 is a print sheet conveyance direction, and a depth direction from the front of the page, which is orthogonal to the print sheet conveyance direction, is referred to as a print sheet width direction, as needed. The printing apparatus 1 is, for example, a high-speed line printer. The printing apparatus 1 uses, for example, a continuous print sheet S as a print sheet. The continuous print sheet S is a long sheet wound into a roll (hereinafter, also referred to as a roll sheet as needed). The printing apparatus 1 is suitable for use in a printing field, for example, in mass printing in print laboratories and the like.

The present embodiment is widely applicable to printing apparatuses in general, such as printers, multifunction printers, copiers, facsimile machines, and manufacturing equipment for various devices. For printing processing, the present embodiment may employ any method, such as an inkjet method, an electrophotographic method, a thermal transfer method, a dot impact method, or a liquid development method. In addition, the present embodiment is also applicable not only to the printing apparatuses but also to sheet conveyance apparatuses each of which performs any of various processes (printing, treatment, coating, irradiation, reading, inspection, and so on) on a roll sheet while conveying the roll sheet. The present embodiment is also applicable to machines having a drying step in manufacturing equipment for various devices.

Structure of Printing Apparatus 1

The printing apparatus 1 in FIG. 1 includes a print sheet feeder unit 102 and a print sheet collector unit 110. The print sheet feeder unit 102 and the print sheet collector unit 110 are units configured to realize various functions of the printing apparatus 1. Each of the units will be described in detail later. The printing apparatus 1 includes a tension adjuster unit 100, a first conveyance roller pair 103, a skew corrector unit 104, a tension detector unit 105, a printer unit 106, a dryer unit 108, a cooler unit 111, and a second conveyance roller pair 109. The skew corrector unit 104, the tension detector unit 105, the printer unit 106, the dryer unit 108, and the cooler unit 111 are arranged in this order along a print sheet conveyance path P from the first conveyance roller pair 103 to the second conveyance roller pair 109. The tension adjuster unit 100, the first conveyance roller pair 103, the skew corrector unit 104, the tension detector unit 105, the printer unit 106, the dryer unit 108, the cooler unit 111, and the second conveyance roller pair 109 are units configured to realize various functions of the printing apparatus 1. Each of the units will be described in detail later. The printing apparatus 1 includes a controller unit 101. The controller unit 101 is a unit configured to realize functions as a main controller of the printing apparatus 1. The continuous print sheet S is conveyed along the print sheet conveyance path P and subjected to processes related to various functions by the respective units. The print sheet conveyance path P is illustrated with a solid line in FIG. 1. In reference to FIG. 1, an example is described in which the print sheet feeder unit 102 and the print sheet collector unit 110 are provided inside the printing apparatus 1. However, the structure is not limited to this example. The print sheet feeder unit 102 and the print sheet collector unit 110 may be provided outside the printing apparatus 1. In this case, the print sheet feeder unit 102 may be provided on a preceding stage side of the printing apparatus 1. On the other hand, the print sheet collector unit 110 may be provided on a subsequent stage side of the printing apparatus 1. FIG. 1 omits illustrations of multiple conveyance rollers arranged at regular intervals along the print sheet conveyance path P.

Print Sheet Feeder Unit 102

The print sheet feeder unit 102 in FIG. 1 holds the continuous print sheet S wound into a roll. The print sheet feeder unit 102 is a unit configured to feed the held continuous print sheet S to the subsequent stage side. The print sheet feeder unit 102 stores, for example, a roll 112 as the continuous print sheet S. The print sheet feeder unit 102 draws out and feeds the stored roll 112 to the subsequent stage side. In reference to FIG. 1, an example is described in which the print sheet feeder unit 102 can store only one roll. However, the structure is not limited to this example. The print sheet feeder unit 102 may store two rolls or three or more rolls. In this case, the print sheet feeder unit 102 may selectively feed one of multiple stored rolls as the continuous print sheet S to the subsequent stage side. The continuous print sheet S is not limited to a roll. For example, the continuous print sheet S may be a sheet in which perforations are provided at intervals of unit length. In this case, the continuous print sheet S may be stored in the print sheet feeder unit 102 in a state where the sheet S is stacked while being folded back at each of the perforations. The continuous print sheet S provided with the perforations as described above is, for example, a continuous-form sheet.

First Conveyance Roller Pair 103

The first conveyance roller pair 103 in FIG. 1 is provided between the print sheet feeder unit 102 and the skew corrector unit 104. The first conveyance roller pair 103 is a unit configured to apply a tension to the continuous print sheet passing through the skew corrector unit 104, the tension detector unit 105, the printer unit 106, the dryer unit 108, and the cooler unit 111 in collaboration with the second conveyance roller pair 109. The first conveyance roller pair 103 includes two rollers, which are arranged opposed to each other. In driving the second conveyance roller pair 109, the two rollers of the first conveyance roller pair 103 rotate in a state where a nip is formed between the two rollers of the first conveyance roller pair 103. The continuous print sheet S is fed to the print sheet conveyance path P through this nip. Thus, the continuous print sheet S is conveyed along the print sheet conveyance path P with a constant tension being applied to the continuous print sheet S. Hereinafter, a conveyance of the continuous print sheet S with a constant tension being applied to the continuous print sheet S will be referred to as a tension conveyance of the continuous print sheet S as needed.

Skew Corrector Unit 104

The skew corrector unit 104 in FIG. 1 is provided between the first conveyance roller pair 103 and the tension detector unit 105. The skew corrector unit 104 is a unit configured to correct a skew of the continuous print sheet S in the print sheet width direction during the tension conveyance of the continuous print sheet S. The skew corrector unit 104 includes multiple skew corrector rollers 104*a* and multiple skew detection sensors not illustrated. Each of the skew detection sensors detects a skew of the continuous print sheet. Each of the skew corrector rollers 104*a* is provided with a not-illustrated motor capable of changing an amount of inclination with respect to the continuous print sheet S. This not-illustrated motor is capable of changing the amount of inclination of the corresponding one of the skew corrector rollers 104*a* with respect to the conveyance direction of the continuous print sheet S. In other words, each of the skew corrector rollers 104*a* can be changed in the amount of inclination with respect to the conveyance direction of the continuous print sheet S. Each of the skew corrector rollers 104*a* functions as a steering roller. With this structure, the skew corrector unit 104 corrects a skew of the continuous print sheet S based on the measurement results of the respective skew detection sensors. In this operation, the continuous print sheet S is wound around each of the skew corrector rollers 104*a*, so that the skew correction function can be enhanced.

Tension Detector Unit 105 and Printer Unit 106

The tension detector unit 105 in FIG. 1 is provided between the skew corrector unit 104 and the printer unit 106.

The tension detector unit 105 is a unit configured to detect a tension of the continuous print sheet S during the tension conveyance of the continuous print sheet S from the first conveyance roller pair 103 to the second conveyance roller pair 109. The printer unit 106 is provided between the tension detector unit 105 and the dryer unit 108. The printer unit 106 includes multiple print heads 113, multiple guide rollers 114, and one head holder 115. The printer unit 106 is a unit configured to perform the printing processing on the continuous print sheet S, being conveyed by the guide rollers 114, with the print heads 113 from above the continuous print sheet S.

Specifically, the multiple guide rollers 114 are arranged at regular intervals along an arc shape convex to the upper side. The guide rollers 114 thus arranged form a conveyance path of the continuous print sheet S in the printer unit 106, which is part of the print sheet conveyance path P. In addition, the guide rollers 114 apply a constant tension to the continuous print sheet S. With this constant tension, a clearance is secured between the print heads 113 and the continuous print sheet S. The multiple print heads 113 are arranged above the guide rollers 114 at regular intervals in an arc shape along the conveyance path formed by the guide rollers 114. The multiple print heads 113 are integrally held by the head holder 115. In the example of FIG. 1, four print heads 113 are respectively provided for four colors of Bk (black), Y (yellow), M (magenta), and C (cyan). The four print heads 113 constitute four line-type print heads 107 each extending along the width direction of the continuous print sheet S. Here, the number of colors of the print heads 113 is not limited to four. As described above, the multiple print heads 113 are integrally held by the head holder 115. For this reason, the head holder 115 is configured to be adjustable in the up-down direction with respect to the continuous print sheet S so that the clearance between the continuous print sheet S and the print heads 113 can be changed. The printer unit 106 may employ any inkjet method such as a method using heating elements, a method using piezoelectric elements, a method using electrostatic elements, or a method using MEMS elements. The ink of each color may be supplied to the corresponding one of the print heads 113 via an ink tube from an ink tank not illustrated.

Dryer Unit 108

The dryer unit 108 in FIG. 1 is provided between the printer unit 106 and the cooler unit 111. The dryer unit 108 is a unit configured to dry the inks applied to the continuous print sheet S in the printer unit 106. Specifically, the dryer unit 108 heats the continuous print sheet S to decrease liquid components in the inks applied to the continuous print sheet S. With this operation, it is possible to enhance the fixation of the inks to the continuous print sheet S. The dryer unit 108 applies hot air to the continuous print sheet S passing through the inside of the dryer unit 108 from at least one side, for example, from the upper side. With this operation, it is possible to dry the surface on which the inks are applied. The drying method may be a combination of the hot air drying method of applying hot air and at least one of an electromagnetic wave irradiation method of irradiating the surface of the continuous print sheet S with electromagnetic waves such as ultraviolet or infrared rays and a conductive heat transfer method of bringing a heating element into contact with the continuous print sheet S. With this combination, drying is performed by not only the hot air drying method but also another method, so that the drying performance can be enhanced. FIG. 1 illustrates an example in which the dryer unit 108 includes a dryer module A 120, a dryer module B 130, a dryer module C 140, and a dryer module D 150. An internal structure of the dryer unit 108 will be described in detail later.

Cooler Unit 111

The cooler unit 111 in FIG. 1 is provided between the dryer unit 108 and the second conveyance roller pair 109. The cooler unit 111 is a unit configured to cool the continuous print sheet S heated by the dryer unit 108. The cooler unit 111 cools the continuous print sheet S by taking outside air and blowing the outside air onto the continuous print sheet S. The continuous print sheet cooled by the cooler unit 111 is collected by the print sheet collector unit 110 arranged on a downstream side of the print sheet conveyance path P. Thus, in the print sheet collector unit 110, the following phenomena are suppressed. First, heat accumulation in the rolled continuous print sheet S is suppressed. Second, ink attachment to the surface of a conveyance roller (not illustrated) in contact with the inks on the continuous print sheet S is suppressed. In addition, the cooler unit 111 may include a heat exchanger. With this structure, the outside air taken in undergoes heat exchange in the heat exchanger, and becomes air with a temperature lower than a temperature of outside air of the printing apparatus 1. Thus, this air with the lower temperature can be blown to the continuous print sheet S. FIG. 1 illustrates an example in which the cooler unit 111 includes a cooler module A 160 and a cooler module B 170. An internal structure of the cooler unit 111 will be described in detail later.

Second Conveyance Roller Pair 109

The second conveyance roller pair 109 in FIG. 1 is provided between the cooler unit 111 and the print sheet collector unit 110. The second conveyance roller pair 109 is a unit configured to apply the tension to the continuous print sheet S in collaboration with the first conveyance roller pair 103. The second conveyance roller pair 109 is also a unit configured to convey the continuous print sheet S with the tension thus applied. The second conveyance roller pair 109 includes two rollers. The two rollers of the second conveyance roller pair 109 are arranged opposed to each other. A motor not illustrated is attached to one of these two rollers. In driving this motor not illustrated, the two rollers of the second conveyance roller pair 109 rotate in a state where a nip is formed between the two rollers of the second conveyance roller pair 109. Here, for example, the tension to be applied to the continuous print sheet S is adjusted as follows. First, the tension detector unit 105 detects the tension of the continuous print sheet S. Second, the tension detector unit 105 outputs the detected tension as a tension value to the tension adjuster unit 100. Third, the tension adjuster unit 100 adjusts the tension of the continuous print sheet S according to the tension value output from the tension detector unit 105. Specifically, the tension to be applied to the continuous print sheet S is adjusted according to the tension value by a clutch (not illustrated) capable of controlling a torque acting on a rotation shaft of the roller of the second conveyance roller pair 109 which is connected to and driven by the motor (not illustrated). Instead, the tension to be applied to the continuous print sheet S may be adjusted by controlling the rotation speed of the rollers of the second conveyance roller pair 109. Thus, the tension to be applied to the continuous print sheet S can be adjusted by controlling at least one of the torque and the rotation speed of the rollers of the second conveyance roller pair 109.

Print Sheet Collector Unit 110

The print sheet collector unit 110 in FIG. 1 is provided on the subsequent stage side of the second conveyance roller pair 109. The print sheet collector unit 110 is a unit configured to wind up the printed continuous print sheet S onto a winding core. The print sheet collector unit 110 winds up the continuous print sheet S conveyed from the second conveyance roller pair 109 onto the winding core, and thereby collects, as a roll, the rolled continuous print sheet S. The number of rolls that can be collected by the print sheet collector unit 110 is not limited to one. For example, the print sheet collector unit 110 may include two winding cores or three or more winding cores. In a design where the print sheet collector unit 110 includes multiple winding cores, the print sheet collector unit 110 may be configured to collect the continuous print sheet S by using one of the multiple winding cores selectively by switching. Depending on a type of treatment processing to be performed after printing, the print sheet collector unit 110 may not necessarily be configured to wind a sheet onto a winding core. For example, the print sheet collector unit 110 may include a cutter. In this case, the print sheet collector unit 110 may be configured to cut the continuous print sheet S by using the cutter. With this structure, the print sheet collector unit 110 may be configured to stack the cut pieces of the continuous print sheet S.

Controller Unit 101

The controller unit 101 in FIG. 1 is a unit configured to control each of the units in the entire printing apparatus 1. The controller unit 101 includes an operation unit 118. The operation unit 118 receives operations by a user. For example, the controller unit 101 may control the printing apparatus 1 based on contents of an operation received through the operation unit 118. The controller unit 101 may receive commands from a host PC 119. For example, the controller unit 101 may control the printing apparatus 1 based on a command from the host PC 119. The host PC 119 is specifically a host computer. An apparatus that controls the printing apparatus 1 from outside is not limited to the host computer. For example, another external terminal such as a smartphone may control the printing apparatus 1. A functional configuration inside the controller unit 101 will be described in detail in reference to FIG. 2.

Figure 2:
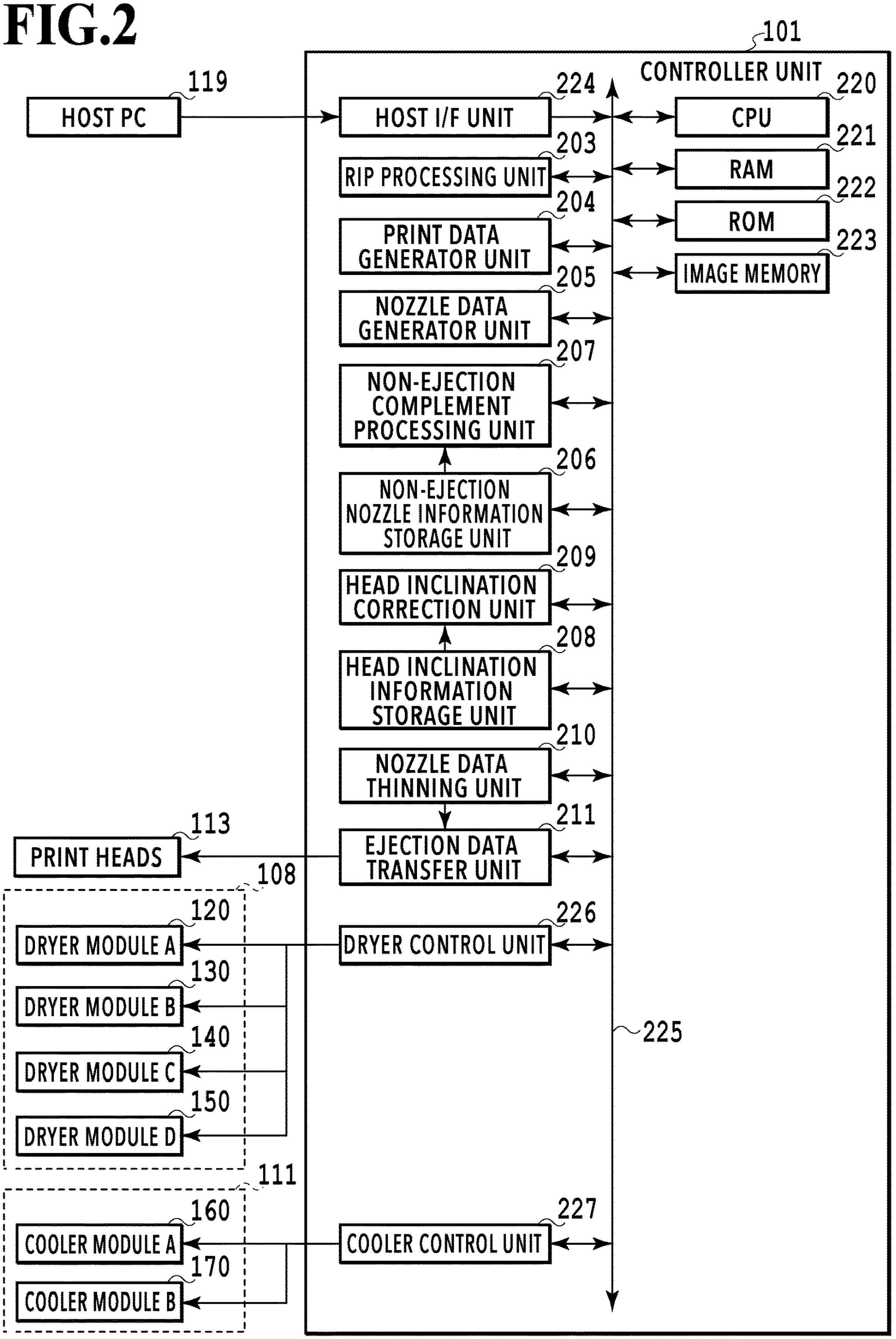
FIG. 2 is a block diagram illustrating an example of a functional configuration of a controller unit.

FIG. 2 is a block diagram illustrating an example of the functional configuration of the controller unit 101. The controller unit 101 includes a central processing unit (CPU) 220, a random access memory (RAM) 221, a read only memory (ROM) 222, and an image memory 223. The CPU 220, the RAM 221, the ROM 222, and the image memory 223 are electrically connected to each other via a system bus 225. The image memory 223 is constituted by, for example, a non-volatile semiconductor memory. The image memory 223 may be used by the printing apparatus 1 as a memory for image processing. The ROM 222 may store therein a program to implement control modules for various kinds of control of the printing apparatus 1. The program stored in the ROM 222 is converted into, for example, object modules in execution. In expansion of the object module onto the RAM 221 serving as a work area for the CPU 220, the object module is converted into a load module in which various libraries and the object module are linked. The load module is one of tasks of an operating system (OS). For example, in the case where the OS executes a task in a preemptive manner, the task may be assigned to the CPU which performs time-sharing control by switching various tasks including the above task at regular time intervals. For example, in the case where the OS executes tasks in a non-preemptive manner, an application executing the program may voluntarily release the CPU from the task at regular time intervals, allowing a task of another application to be assigned to the CPU. In addition, at least one of data for the various kinds of control of the printing apparatus 1 and the program to implement the control modules for the various kinds of control of the printing apparatus 1 may be obtained from outside of the printing apparatus 1.

The controller unit 101 includes a raster image processor (RIP) processing unit 203, a print data generator unit 204, and a nozzle data generator unit 205. The RIP processing unit 203, the print data generator unit 204, and the nozzle data generator unit 205 are electrically connected to the CPU 220 via the system bus 225. With this connection structure, the RIP processing unit 203, the print data generator unit 204, and the nozzle data generator unit 205 can receive various control commands from the CPU 220.

The controller unit 101 includes a non-ejection nozzle information storage unit 206, a non-ejection complement processing unit 207, a head inclination information storage unit 208, and a head inclination correction unit 209. The non-ejection nozzle information storage unit 206, the non-ejection complement processing unit 207, the head inclination information storage unit 208, and the head inclination correction unit 209 are electrically connected to the CPU 220 via the system bus 225. With this connection structure, the non-ejection nozzle information storage unit 206, the non-ejection complement processing unit 207, the head inclination information storage unit 208, and the head inclination correction unit 209 can receive various control commands from the CPU 220.

The controller unit 101 includes a nozzle data thinning unit 210 and an ejection data transfer unit 211. The controller unit 101 includes a host I/F unit 224. The nozzle data thinning unit 210, the ejection data transfer unit 211, and the host I/F unit 224 are electrically connected to the CPU 220 via the system bus 225. With this connection structure, the nozzle data thinning unit 210, the ejection data transfer unit 211, and the host I/F unit 224 can receive various control commands from the CPU 220. The host I/F unit 224 functions as an interface between the printing apparatus 1 and the host PC 119. The host PC 119 may input print data to the controller unit 101 through the host I/F unit 224. The print data input from the host PC 119 may be rendered by the RIP processing unit 203. The rendered print data is raster data, for example, multi-value bitmap data.

The print data input from the host PC 119 to the controller unit 101 is configured, for example, in page description language (PDL). The multi-value bitmap data generated by rendering the print data by the RIP processing unit 203 may be transferred to the print data generator unit 204. The print data generator unit 204 is capable of performing ink color conversion and quantization processing on the multi-value bitmap data. For example, the print data generator unit 204 can generate half-tone data for each ink color based on the multi-value bitmap data. The half-tone data may be transferred to the nozzle data generator unit 205. The nozzle data generator unit 205 can allocate the half-tone data to nozzles for each color. As a result, the half-tone data is transformed to nozzle data (binary data) for the number of nozzles in each line. The nozzle data may be transferred to the non-ejection complement processing unit 207. The non-ejection complement processing unit 207 can perform non-ejection complement processing on the nozzle data. The non-ejection complement processing is processing of reallocating the ejection data allocated to a non-ejection nozzle to a normal nozzle other than the non-ejection nozzle. In execution of the non-ejection complement processing, the non-ejection complement processing unit 207 may refer to non-ejection nozzle information stored in the non-ejection nozzle information storage unit 206. The non-ejection complement processing unit 207 may perform the non-ejection complement processing on the nozzle data based on the non-ejection nozzle information. The nozzle data after the non-ejection complement processing may be transferred to the head inclination correction unit 209. The head inclination correction unit 209 performs head inclination correction on the nozzle data after the non-ejection complement processing. The head inclination correction is correction processing of moving the nozzle data in the conveyance direction according to the amount of inclination of the head. In execution of the head inclination correction, the head inclination correction unit 209 may refer to head inclination information stored in the head inclination information storage unit 208. The head inclination correction unit 209 can perform the head inclination correction on the nozzle data after the non-ejection complement processing based on the head inclination information. The nozzle data after the head inclination correction is stored in the image memory 223.

The CPU 220 may transfer the nozzle data stored in the image memory 223 to the nozzle data thinning unit 210. The nozzle data thinning unit 210 performs thinning processing on the transferred nozzle data after the inclination correction. The nozzle data thinning unit 210 transfers the nozzle data after the thinning processing to the ejection data transfer unit 211. The ejection data transfer unit 211 transfers, to the print heads 113, the nozzle data transferred from the nozzle data thinning unit 210. Through such operations, the printer unit 106 performs the print processing on the continuous print sheet S with the print heads 113 based on the nozzle data in which the inclinations of the print heads 113 are corrected.

The controller unit 101 includes a dryer control unit 226. The dryer unit 108 includes, for example, the dryer module A 120, the dryer module B 130, the dryer module C 140, and the dryer module D 150. The dryer control unit 226 performs temperature control of the dryer unit 108. Specifically, the dryer control unit 226 controls the temperature of each of the dryer module A 120, the dryer module B 130, the dryer module C 140, and the dryer module D 150. The dryer control unit 226 may poll the dryer unit 108 (periodically inquire about the temperature). Instead, the dryer control unit 226 may determine whether a response from the dryer unit 108 indicates a normal temperature. Through this operation, the dryer control unit 226 can determine whether or not each of the dryer modules A 120, B 130, C 140, and D 150 normally operates. The controller unit 101 includes a cooler control unit 227. The cooler unit 111 includes, for example, the cooler module A 160 and the cooler module B 170. A structure of the cooler module A 160 will be described later in reference to FIG. 4. The dryer control unit 226 and the cooler control unit 227 are electrically connected to the CPU 220 via the system bus 225. With this connection structure, the dryer control unit 226 and the cooler control unit 227 can receive various control commands from the CPU 220.

Structure of Dryer Module A 120

Outline of Structure

Figure 3A:
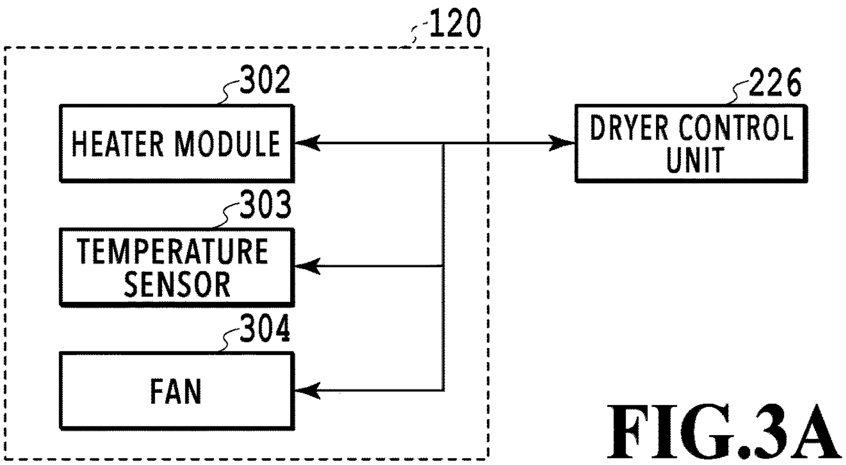
FIGS. 3A to 3C are a diagram and views illustrating an example of a structure of a dryer module.
Figure 3B:
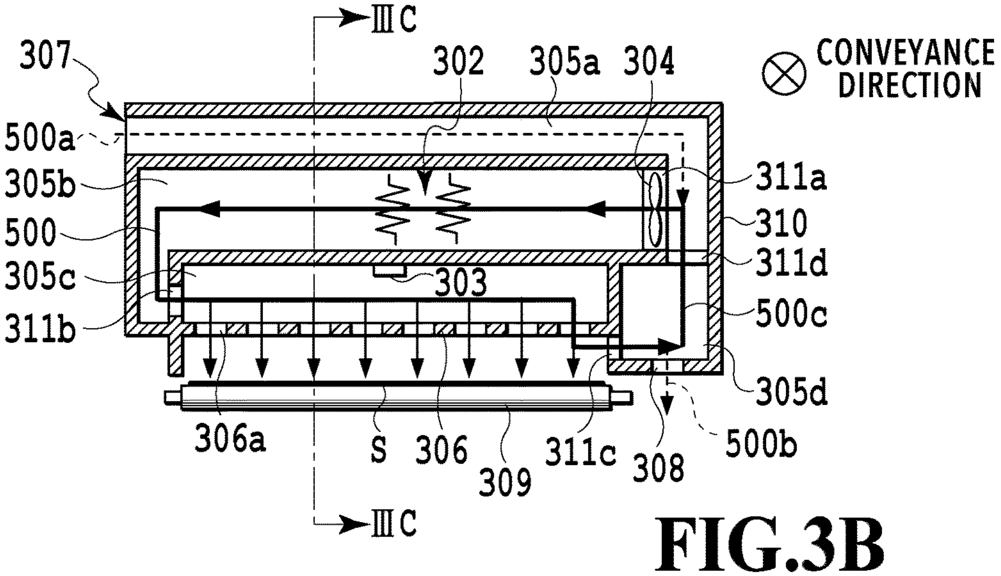
Figure 3C:
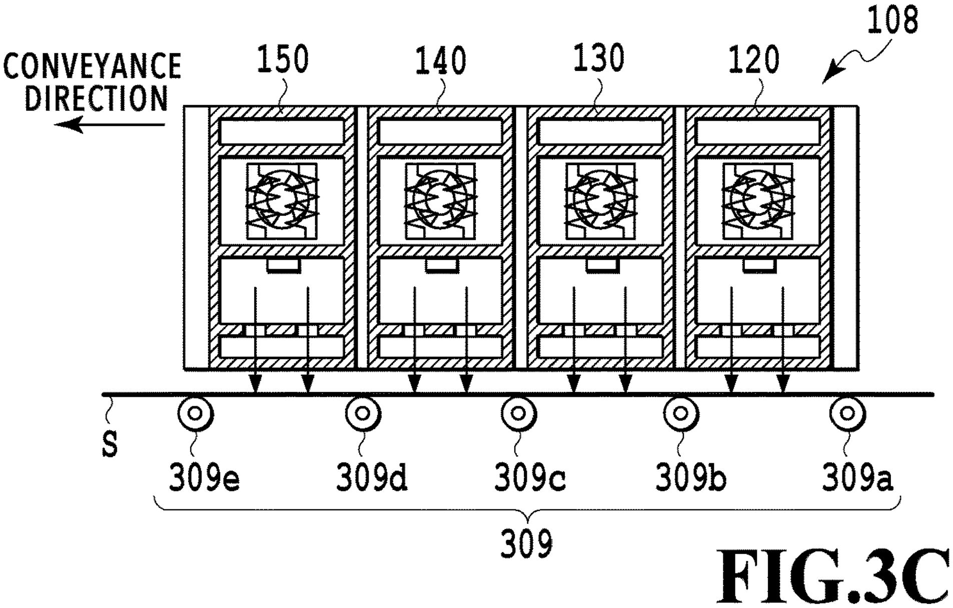

FIGS. 3A to 3C are a diagram and views illustrating an example of the dryer module A 120. FIG. 3A is a diagram illustrating an example of a hardware configuration of the dryer module A 120. The dryer module A 120 includes a heater module 302, a temperature sensor 303, and a fan 304. The heater module 302 has a function as a heater unit to heat outside air taken into the inside of the dryer module A 120. The temperature sensor 303 has a function as a temperature detector unit to detect the temperature inside the dryer module A 120. The temperature sensor 303 is constituted by, for example, a thermistor. The fan 304 has a function as a blower unit to perform a blowing operation of blowing out the heated outside air in a certain direction. The fan 304 is constituted by, for example, an axial fan. The present embodiment is described based on the assumption that the fan 304 is constituted by the axial fan. The dryer control unit 226 may receive information on a target temperature inside the dryer module A 120 as a control command from the CPU 220 in FIG. 2. Instead, the dryer control unit 226 may hold the information on the target temperature inside the dryer module A 120 in advance. Instead, the dryer control unit 226 may receive the information on the target temperature inside the dryer module A 120 from the host PC 119 in FIG. 2. Instead, the dryer control unit 226 may fetch the information on the target temperature inside the dryer module A 120 from various data developed onto the RAM 221 in FIG. 2.

The dryer control unit 226 sets ON or OFF for the heater module 302 based on the hot air temperature of a measurement target of the temperature sensor 303. Instead of setting ON or OFF, the dryer control unit 226 may make setting of repeatedly alternating an ON state and an OFF state according to a DUTY ratio. For example, in the case where the target temperature is 70° C. and the hot air temperature of the measurement target obtained from the temperature sensor 303 is 60° C., the dryer control unit 226 performs control to set the DUTY ratio of the heater module 302 to, for example, 100% so as to raise the hot air temperature. Instead, in the case where the hot air temperature of the measurement target exceeds 70° C., the dryer control unit 226 performs control to set the DUTY ratio of the heater module 302 to, for example, 10% so as to lower the hot air temperature. These values are just examples and may be changed. The measurement target of the temperature sensor 303 will be described in detail later in reference to FIG. 3B.

Structure of Dryer Module A 120

Structure for Taking in Outside Air

FIG. 3B is a schematic cross-sectional view of the dryer module A 120 taken along the print sheet width direction, which is seen from the upstream side in the sheet conveyance direction. In FIG. 3B, the direction from the front side to the back side of the page is the conveyance direction of the continuous print sheet S. The dryer module A 120 is constituted by a frame body 310. For example, a material for the frame body 310 is a metal. For example, the frame body 310 may be formed by cutting, assembled by welding parts formed by pressing, or molded with a 3D printer. The material for the frame body 310 is not limited to a metal. The material for the frame body 310 may be any material that will not deform even under a heating operation by the heater module 302.

The frame body 310 integrally includes an intake duct 305*a*, a heating duct 305*b*, a guide duct 305*c*, and a return duct 305*d*. Each of the intake duct 305*a*, the heating duct 305*b*, the guide duct 305*c*, and the return duct 305*d* has a hollow structure. Each of the intake duct 305*a* and the heating duct 305*b* has an L-shaped cross section. Each of the guide duct 305*c* and the return duct 305*d* has a rectangular cross section.

An intake port 307 is provided to an end face of a longitudinal member of the L-shaped intake duct 305*a*. The intake port 307 is configured as a hole for taking in outside air. A ventilation port 311*a* is provided to an end face of a longitudinal member of the L-shaped heating duct 305*b*. The fan 304 is attached to the ventilation port 311*a*. Of a short-side member of the L-shaped intake duct 305*a*, a portion facing the fan 304 is opened. Thus, the downstream side of the intake duct 305*a* is connected to the upstream side of the fan 304. As illustrated in FIG. 3B, an air passage through which outside air passes is formed. In the air passage, the outside air passes through the intake port 307, the longitudinal member of the intake duct 305*a*, the short-side member of the intake duct 305*a*, and the ventilation port 311*a* in this order. Further, in the air passage, after the ventilation port 311*a*, the outside air passes through the longitudinal member of the heating duct 305*b* and a short-side member of the heating duct 305*b* in this order. With this structure of the air passage, if the fan 304 rotates so as to cause air to flow from the intake port 307 to the ventilation port 311*a*, outside air taken in through the intake port 307 flows into the heating duct 305*b* through the intake duct 305*a*. Here, in the structure in which the fan 304 is arranged upstream of the heater module 302, in order to cause air to flow from the intake port 307 to the ventilation port 311*a*, the fan 304 only has to be arranged so that the positive pressure side of the fan 304 faces the heater module 302.

The heater module 302 is arranged in the middle of the air passage of the heating duct 305*b*. FIG. 3B illustrates an example in which the heater module 302 is arranged downstream of the fan 304. Thus, with the rotation of the fan 304, the outside air flowing into the heating duct 305*b* is heated by the heater module 302 to be heated outside air. A guide port 311*b* is provided at a lower portion of a left side of the guide duct 305*c*. Of a short-side member of the L-shaped heating duct 305*b*, a portion facing the guide port 311*b* is opened. Thus, as illustrated in FIG. 3B, an air passage is formed in which outside air passes through the ventilation port 311*a*, the longitudinal member of the heating duct 305*b*, the short-side member of the heating duct 305*b*, the guide port 311*b*, and the guide duct 305*c* in this order. With this structure of the air passage, heated outside air, which is the outside air heated by the heater module 302, is blown by the fan 304 in the downstream direction of the fan 304 and thereby flows into the guide duct 305*c* through the guide port 311*b*.

A nozzle unit 306 is provided in a lower side of the guide duct 305*c*. The nozzle unit 306 includes multiple nozzle ports 306*a*. The multiple nozzle ports 306*a* are through holes provided at regular intervals. The continuous print sheet S being transferred by backup rollers 309 passes below the multiple nozzle ports 306*a*. An inlet port 311*c* is provided at a lower portion of a left side of the return duct 305*d*. The position of the inlet port 311*c* is below the multiple nozzle ports 306*a* and above the backup rollers 309. A return port 311*d* is provided in an upper side of the return duct 305*d*. An exhaust port 308 is provided in a lower side of the return duct 305*d*. Thus, the downstream side of the return duct 305*d* is connected to the downstream side of the intake duct 305*a*. As a result, as illustrated in FIG. 3B, an air passage is formed in which the heated outside air passes through the guide duct 305*c* and the multiple nozzle ports 306*a* and then along the surface of the continuous print sheet S, and part of the heated outside air is returned to the ventilation port 311*a* through the inlet port 311*c* and the return port 311*d*. In addition, an air passage is also formed in which part of the heated outside air flowing into the inlet port 311*c* is discharged through the exhaust port 308 to the outside of the frame body 310. With the structure of these air passages, the heated outside air is guided to the continuous print sheet S. Part of the heated outside air after passing along the continuous print sheet S flows into the return duct 305*d* through the inlet port 311*c*. Part of the heated outside air flowing into the return duct 305*d* is discharged from the exhaust port 308 provided on the lower side, whereas the remaining part of the heated outside air is guided to the fan 304 through the return port 311*d* provided on the upper side.

Measurement Target and Installation Location of Temperature Sensor 303

The temperature sensor 303 is provided in the guide duct 305*c* constituting a portion of the frame body 310. In this layout structure, the measurement target of the temperature sensor 303 is the guide duct 305*c*. As the temperature of the guide duct 305*c* rises, the temperature of the frame body 310 also rises. As the temperature of the frame body 310 rises, the temperature of the fan 304 also rises. If the temperature of the fan 304 rises, the temperature of the fan 304 may exceed its heat-resistant temperature. For example, if a detection result of the temperature sensor 303 changes from 60° C. to 80° C., the temperature of the frame body 310 may also rise similarly and the temperature of the fan 304 may also rise. Thus, a phenomenon at which the temperature of the guide duct 305*c* is equal to or higher than a predetermined temperature may be used as a trigger for increasing the volume of outside air flowing into the fan 304.

The temperature sensor 303 may be provided to the fan 304. In this layout structure, the measurement target of the temperature sensor 303 is the fan 304. Thus, the temperature of the fan 304 can be detected. Therefore, a phenomenon at which the temperature of the fan 304 is equal to or higher than a predetermined temperature may be used as a trigger for increasing the volume of outside air flowing into the fan 304. Instead, the temperature sensor 303 may be provided to the heating duct 305*b* constituting a portion of the frame body 310. In this layout structure, the measurement target of the temperature sensor 303 is the heating duct 305*b*. Thus, the temperature of the heating duct 305*b* can be detected. Therefore, a phenomenon at which the temperature of the heating duct 305*b* is equal to or higher than a predetermined temperature may be used as a trigger for increasing the volume of outside air flowing into the fan 304.

In other words, the measurement target of the temperature sensor 303 may be anything that can change in temperature according to heated outside air. Therefore, the temperature sensor 303 may be provided in any place inside the dryer module A 120. In addition, since the material for the frame body 310 is a metal, the measurement target of the temperature sensor 303 may be any portion of the frame body 310. A phenomenon at which the temperature of the frame body 310 is equal to or higher than a predetermined temperature may be used as a trigger for increasing the volume of outside air flowing into the fan 304.

In sum, the air passage formed by the frame body 310 is provided with the heater module 302 and the fan 304. As indicated as a hot air circulation path 500 illustrated with a thick solid line in FIG. 3B, the air passage is configured such that hot air, which is the heated outside air heated by the heater module 302, can be blown to the continuous print sheet S on the print sheet conveyance path P through the nozzle unit 306. The frame body 310 is provided with the intake port 307 for introducing outside air and the exhaust port 308 for discharging just a desired volume of air having a humidity increased after being used to dry a medium such as the continuous print sheet S. Since the structures of the dryer module B 130, the dryer module C 140, and the dryer module D 150 are the same as the structure of the dryer module A 120, description thereof is omitted herein. Here, the dryer module A 120, the dryer module B 130, the dryer module C 140, and the dryer module D 150 may be referred to as the dryer module as appropriate, in a case where they do not have to be distinguished from each other in particular.

Flows of Outside Air Taken in

In reference to FIG. 3B, the hot air circulation path 500 will be described. The hot air circulation path 500 is a part of the air passage constituted by the hollow structure of the frame body 310. The hot air circulation path 500 allows part of the heated outside air to circulate through the downstream side of the intake duct 305*a*, the heating duct 305*b*, the guide duct 305*c*, and the return duct 305*d* in this order. Such hot air circulation method using the hot air circulation path 500 is employed for the following reasons. One of the reasons is to effectively use thermal energy acted on the air by the heater module 302. The other reason is to shorten a warm-up time for the printing apparatus 1 to reach a desired temperature at the start of use. Outside air 500*a* taken in through the intake port 307 is drawn by the fan 304. Part 500*b* of the heated outside air after drying is discharged through the exhaust port 308 to the outside of the frame body 310. The undischarged part 500*c* of the heated outside air is again taken in by the fan 304 and circulated.

FIG. 3C is a cross-sectional view of FIG. 3B taken at a line IIIC-IIIC along the conveyance direction of the continuous print sheet S. The dryer module A 120, the dryer module B 130, the dryer module C 140, and the dryer module D 150 are arranged side by side along the conveyance direction. That is, as illustrated in FIGS. 1 and 3C, multiple dryer modules may be arranged along the conveyance direction of the continuous print sheet S. Backup rollers 309*a* to 309*e* are arranged on an opposed side across the continuous print sheet S. The backup rollers 309*a* to 309*e* support the back surface of the continuous print sheet S so as to prevent the continuous print sheet S from being blown too far away from the dryer modules upon application of the hot air. Here, the number of dryer modules is not particularly limited. A structure in which multiple dryer modules are arranged is also capable of improving the productivity by drying a continuous print sheet S more quickly than a structure in which one dryer module is arranged.

Structure of Cooler Module A 160

Outline of Structure

Figure 4A:
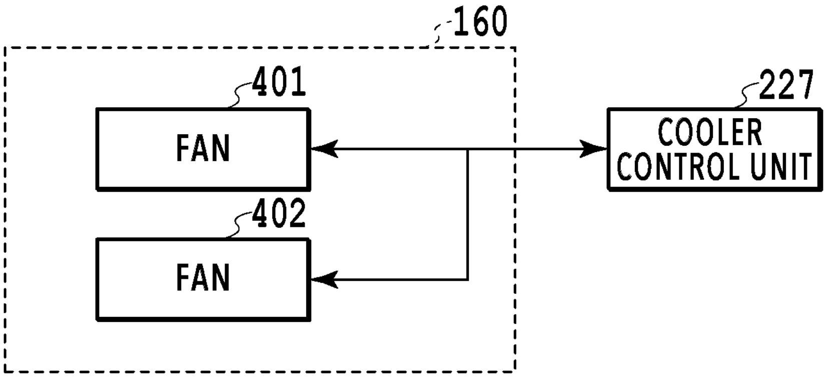
FIGS. 4A and 4B are a diagram and a view illustrating an example of a structure of a cooler module.
Figure 4B:
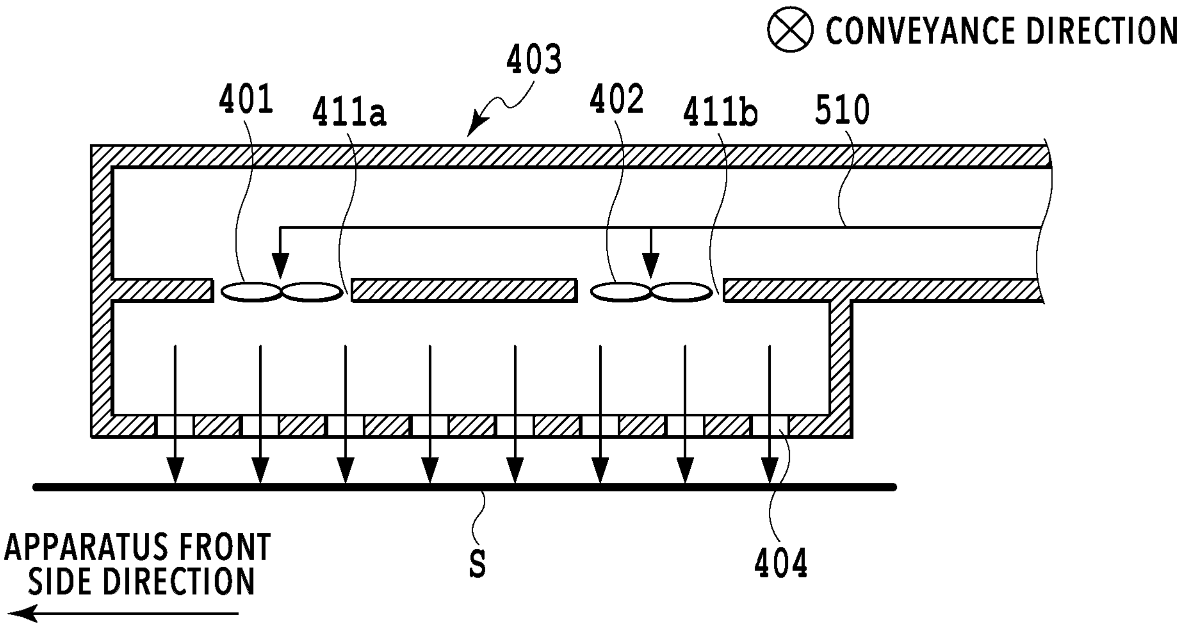

FIGS. 4A and 4B are a diagram and a view illustrating an example of a structure of the cooler module A 160. FIG. 4A is a diagram illustrating an example of a hardware configuration of the cooler module A 160. The cooler module A 160 includes a fan 401 and a fan 402. The cooler control unit 227 controls the rotation speeds of the fan 401 and the fan 402. Each of the fan 401 and the fan 402 is provided with a not-illustrated encoder or detector unit configured to detect a lock (rotation failure). The encoder can detect the amount of rotation of the corresponding one of the fan 401 and the fan 402. The detector unit can detect whether or not the corresponding one of the fan 401 and the fan 402 is locked. Thus, the cooler control unit 227 can determine whether or not the fan 401 and the fan 402 normally rotate.

Structure of Cooler Module A 160

Structure for Taking in Outside Air

FIG. 4B is a cross-sectional view of the cooler module A 160 along the print sheet width direction, which is seen from the upstream side in the sheet conveyance direction. In FIG. 4B, the direction from the front side to the back side of the page is the conveyance direction of the continuous print sheet S. In FIG. 4B, the left side of the page is a front side of the printing apparatus 1. The cooler module A 160 is constituted by a duct 403. For example, a material for the duct 403 is a metal. The duct 403 may be formed by cutting, assembled by welding parts formed by pressing, or molded with a 3D printer. The material for the duct 403 is not limited to a metal.

The duct 403 includes an intake air passage for taking in outside air and an air exit passage provided below the intake air passage. Through holes 411*a* and 411*b* are provided between the intake air passage and the air exit passage. The fan 401 is provided in the through hole 411*a*. The fan 402 is provided in the through hole 411*b*. Both of the fan 401 and the fan 402 are axial fans. Multiple exhaust ports 404 are provided at regular intervals in a lower side of the air exit passage. The exhaust ports 404 are provided at positions opposed to the print sheet conveyance path P along which the continuous print sheet S is to be conveyed. With this structure, as the fan 401 and the fan 402 rotate, outside airflows in a direction of an arrow 510 and is blown through the multiple exhaust ports 404 to one surface side, for example, a printed surface side of the continuous print sheet S. Therefore, the continuous print sheet S can be cooled by the outside air.

Operation Principle

Figure 5:
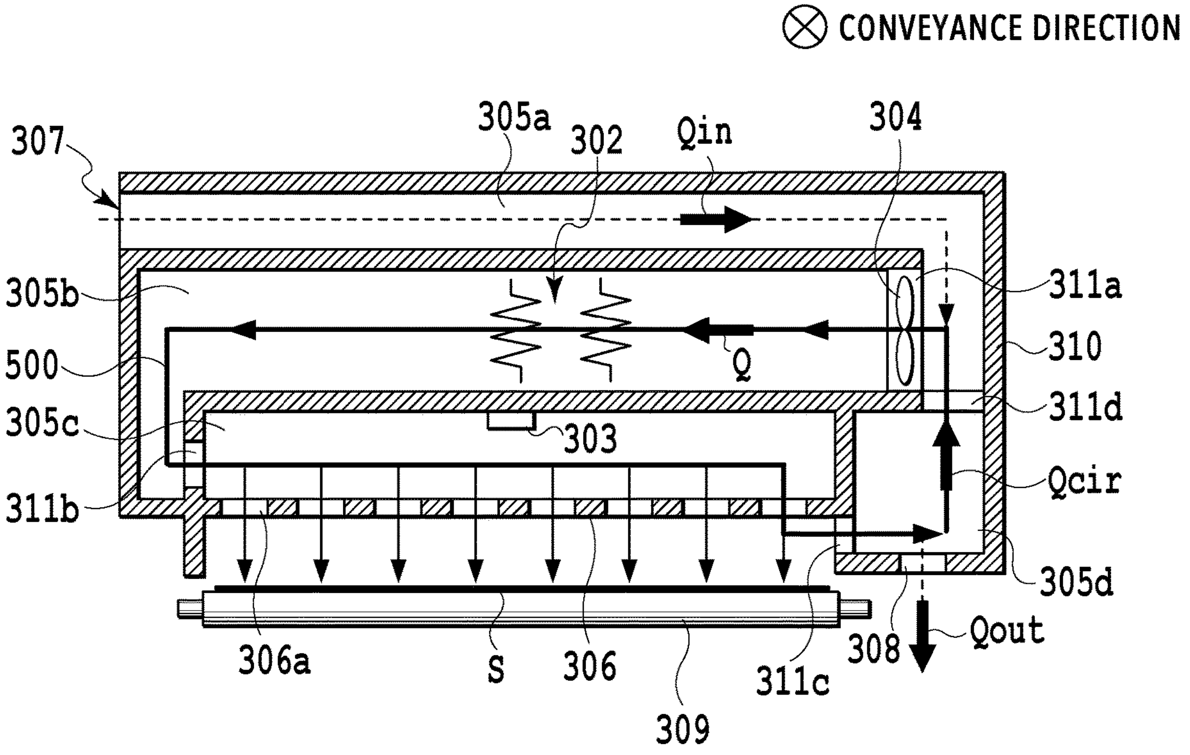
FIG. 5 is a cross-sectional view of the dryer module.

FIG. 5 is a cross-sectional view of the dryer module A 120. In reference to FIG. 5, a process of suppressing a temperature rise of the dryer module A 120 will be described. A flow rate of air blown by the fan 304 is denoted by Q [$m^3$/min]. With the rotation of the fan 304, the outside air taken in through the intake port 307 becomes heated outside air heated by the heater module 302. The heated outside air moves as hot air along the hot air circulation path 500 in FIG. 5. Then, the hot air at a flow rate Qout [$m^3$/min] is discharged through the exhaust port 308. The air at a flow rate Qcir [$m^3$/min] is returned to the fan 304. In addition, outside air taken in through the intake port 307 at a flow rate Qin [$m^3$/min] is mixed with the hot air at the flow rate Qcir. If small pressure losses in the system of the hot air circulation path 500 are ignored, the flow rates generally have a relationship defined by the following formula:

$$Q = Qcir + Qin = Qcir + Qout \quad \text{(Formula 1)}$$

Here, for example, it is assumed that the hot air temperature in the nozzle unit 306 is 70° C. and the temperature of the outside air taken in through the intake port 307 is 30° C. According to this assumption, a relationship of the outside air temperature Tout [° C.]< the hot air temperature Tair [° C.] holds. If the flow rate Q is increased by ΔQ by increasing the rotation speed of the fan 304 under the condition that an output J [kcal/h] of the heater module 302 is not increased, the temperature of the circulating hot air will drop below 70° C. If an effect of a self-temperature rise of the fan 304 and a heat loss in the hot air circulation path 500 are ignored, a simple way of calculation of the flow rate change ΔQ required to lower the hot air temperature is expressed by the following formula:

$$\Delta Q[m^3/\text{min}] = J[\text{kcal}/h] / \{(Tair - Tout)[°\,C.] * \gamma[kg/m^3] * Cp[\text{kcal}/(kg * °\,C.)] * 60[\text{min}/h]\}, \quad \text{(Formula 2)}$$

where $\gamma$ [kg/m$^3$] denotes a specific gravity of air and Cp [kcal/(kg*° C.)] denotes a specific heat of air at constant pressure.

Temperature Profile

In this way, an air flow generated by the fan 304, which serves as an air blower unit, can suppress a temperature rise of the fan 304 itself. If the hot air temperature is raised within a range below the heat-resistant temperature of the fan 304, the temperature sensor 303 does not necessarily have to be provided to the fan 304. The installation location of the temperature sensor 303 may be any portion of the frame body 310 as described above. In this case, a temperature profile of the temperature sensor 303 provided at the portion of the frame body 310 just has to be created in advance. The temperature of the fan 304 can be predicted based on this temperature profile and a detection result by the temperature sensor 303. Here, the temperature profile indicates temperature detection results by the temperature sensor 303 as a time-series dataset. Thus, the temperature of the fan 304 can be predicted from the time-series dataset by using a statistical method such as regression analysis. For example, for a structure where the measurement target of the temperature sensor 303 is the guide duct 305*c*, it is only necessary to create a temperature profile of a correspondence relationship between a time-series dataset on temperature changes of the guide duct 305*c* and a time-series dataset on temperature changes of the fan 304. This makes it possible to predict the current temperature of the fan 304 by making interpolation in these time-series datasets through statistical processing based on a detection result by the temperature sensor 303 and the temperature profile. Instead, for a structure where the measurement target of the temperature sensor 303 is the heating duct 305*b*, it is only necessary to create a temperature profile of a correspondence relationship between a time-series dataset on temperature changes of the heating duct 305*b* and a time-series dataset on temperature changes of the fan 304. This makes it possible to predict the current temperature of the fan 304 by making interpolation in these time-series datasets through statistical processing based on a detection result by the temperature sensor 303 and the temperature profile. In sum, in a case of a structure using the temperature profile, the measurement target of the temperature sensor 303 may be any portion of the frame body 310. For example, in a case of a structure where the temperature sensor 303 is provided to the guide duct 305*c* in the frame body 310, the temperature of the guide duct 305*c* detected by the temperature sensor 303 can be used as the temperature of the fan 304. If the hot air temperature falls below a desired range, the hot air temperature can be raised again by feedback control to increase the output of the heater module 302. Falling below the desired range mentioned herein means that the temperature falls below a temperature required to evaporate the liquid components of inks constituting an image formed on the continuous print sheet S. The required temperature herein is, for example, the target temperature inside the dryer module A 120 as described above. An operation example of temperature rise suppression processing will be described based on the above principle.

Operation Example

Figure 6:
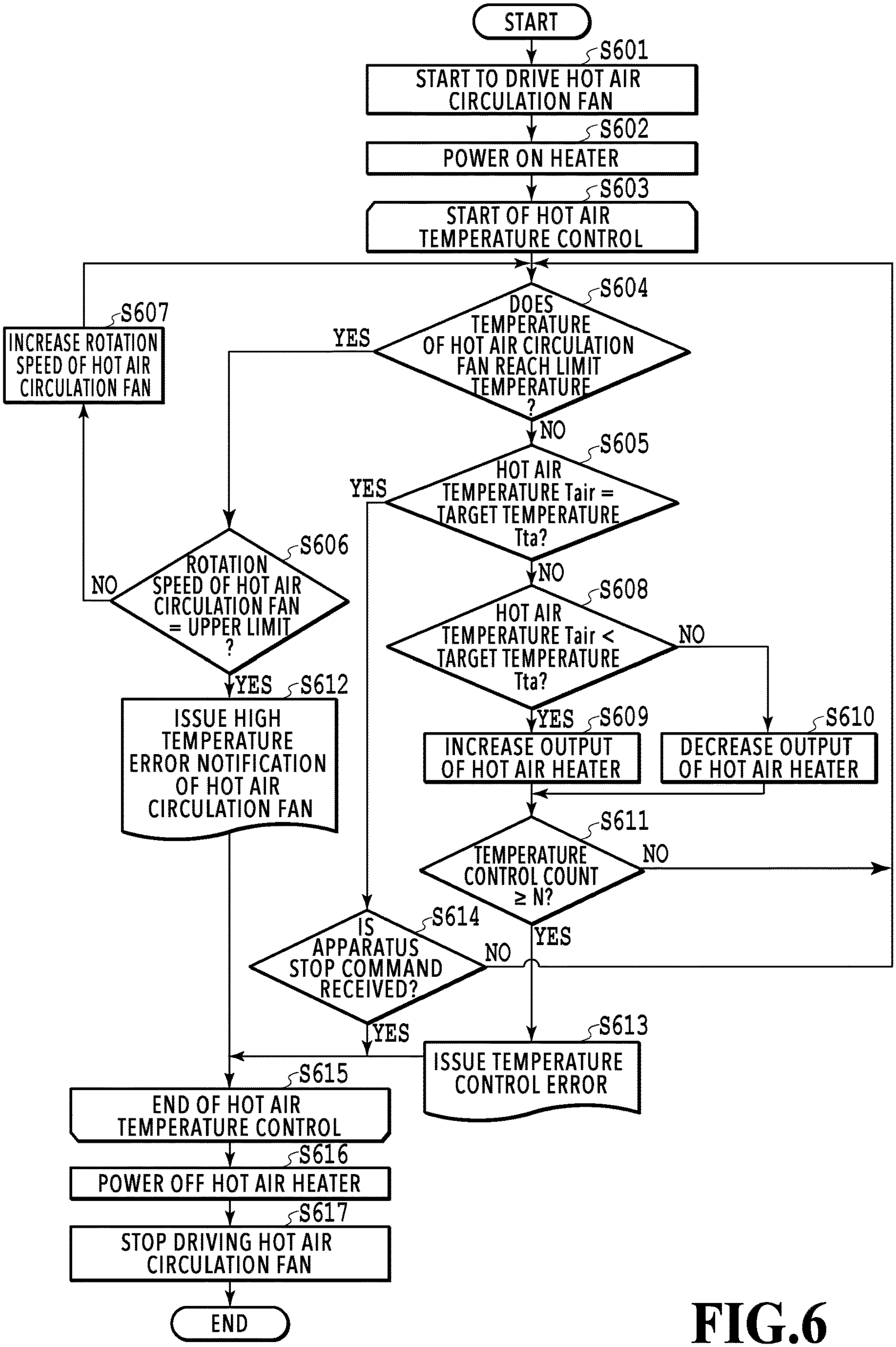
FIG. 6 is a flowchart for explaining temperature rise suppression processing.

FIG. 6 is a flowchart for explaining the temperature rise suppression processing. The temperature rise suppression processing is implemented by the CPU 220 reading out the program to implement the control modules stored in the ROM 222 into the RAM and executing them. Some or all of functions in steps of FIG. 6 may be implemented by hardware such as an ASIC or electronic circuit. Sign "S" in description of the processing indicates a step in this flowchart.

The flowchart in FIG. 6 is started with a transmission of a control command from the CPU 220 to the dryer control unit 226. Specifically, the flowchart presents the processing started in a case where a control command to start the temperature rise suppression processing is transmitted to each of the dryer module A 120, the dryer module B 130, the dryer module C 140, and the dryer module D 150. Thus, this processing is premised on at least a situation where print processing by the printer unit 106 is running. Here, the trigger for starting the processing in the flowchart in FIG. 6 is not limited to the above example. For example, the dryer control unit 226 may start the processing in the flowchart in FIG. 6 if the CPU 220 determines that the printing apparatus 1 has already operated for a certain period of time and the heat has built up in the printing apparatus 1.

In S601, the dryer control unit 226 starts to drive a hot air circulation fan. The hot air circulation fan herein is the fan 304. In S602, the dryer control unit 226 sets the heater module 302 to an ON state. The ON state herein means that the heater module 302 turns to a stable state at a predetermined temperature upon lapse of a warm-up time after power-on. In S603, the dryer control unit 226 starts hot air temperature control. Here, the hot air temperature control means that the dryer control unit 226 performs monitoring control based on a detection result by the temperature sensor 303 by rotating the fan 304 while keeping the heater module 302 in the ON state. The monitoring control herein means to perform any one of processing (S607) of increasing the rotation speed of the hot air circulation fan and processing (S606, S609, S610) of increasing/decreasing the output of a hot air heater, based on a detection result by the temperature sensor 303 (S604). In addition, during the monitoring, an error notification is made if needed (S606, S611, S612, S613). A message in the error notification is displayed on, for example, a display unit (not illustrated) of the printing apparatus 1.

In S604, the dryer control unit 226 determines whether or not the temperature of the hot air circulation fan reaches a limit temperature. The limit temperature is an upper limit value of the heat-resistant temperature of the fan 304 and is, for example, 80° C. If determining that the temperature of the hot air circulation fan reaches the limit temperature, the dryer control unit 226 proceeds to S606. If determining that the temperature of the hot air circulation fan does not reach the limit temperature, the dryer control unit 226 proceeds to S605.

Control of Fan 304

In S606, the dryer control unit 226 determines whether or not the rotation speed of the hot air circulation fan reaches an upper limit. If determining that the rotation speed of the hot air circulation fan reaches the upper limit, the dryer control unit 226 proceeds to S612. If determining that the rotation speed of the hot air circulation fan does not reach the upper limit, the dryer control unit 226 proceeds to S607. The dryer control unit 226 increases the rotation speed of the hot air circulation fan in S607 and returns to S604. On the other hand, the dryer control unit 226 makes a high temperature error notification of the hot air circulation fan in S612 and proceeds to S615. The dryer control unit 226 terminates the hot air temperature control in S615 and proceeds to S616. The dryer control unit 226 turns the heater module 302 to an OFF state in S616 and proceeds to S617. The dryer control unit 226 stops driving the hot air circulation fan in S617 and terminates the processing.

Control of Heater Module 302

In S605, the dryer control unit 226 determines whether or not the hot air temperature Tair [° C.] is equal to a target temperature Tta [° C.]. Here, the target temperature Tta is the foregoing target temperature. That is, it is the target temperature inside the dryer module A 120. Specifically, the processing in S605, S608, S609, S610, and S611 is processing in which the dryer control unit 226 controls the DUTY cycle of the heater module 302 so that the temperature of the measurement target of the temperature sensor 303 can reach the target temperature. If determining that the hot air temperature Tair [° C.] is equal to the target temperature Tta [° C.], the dryer control unit 226 proceeds to S614. Proceeding to the processing in S614 means that the hot air temperature Tair [° C.] reaches the target temperature Tta [° C.]. Therefore, the dryer control unit 226 can save power consumption by determining whether or not to still continue the processing in S605, S608, S609, S610, and S611. If determining that there is an apparatus stop command in the processing in S614, the dryer control unit 226 stops continuing the processing in S605, S608, S609, S610, and S611. In other words, by monitoring the determination result in S605, the dryer control unit 226 can save the power consumption of the heater module 302. Here, a trigger for an apparatus stop command may be, for example, a termination of conveyance of the continuous print sheet S on which an image is formed. Instead, the trigger may be a lapse of a predetermined period of time while a state where the hot air temperature Tair [° C.] reaches the target temperature Tta [° C.] is kept, or in other words, a state where the hot air temperature Tair [° C.] does not fall below the target temperature Tta [° C.] is kept. Alternatively, the trigger may be a shift of the printing apparatus 1 to a shutdown mode.

In S614, the dryer control unit 226 determines whether or not an apparatus stop command is received. If determining that the apparatus stop command is received, the dryer control unit 226 proceeds to S615. If determining that the apparatus stop command is not received, the dryer control unit 226 returns to S604. On the other hand, if determining in S605 that the hot air temperature Tair [° C.] is not equal to the target temperature Tta [° C.], the dryer control unit 226 proceeds to S606. In S606, the dryer control unit 226 determines whether or not the hot air temperature Tair [° C.] is lower than the target temperature Tta [° C.]. If determining that the hot air temperature Tair [° C.] is lower than the target temperature Tta [° C.], the dryer control unit 226 proceeds to S609. The dryer control unit 226 increases the output of the hot air heater in S609 and proceeds to S611. If determining that the hot air temperature Tair [° C.] is not lower than the target temperature Tta [° C.], the dryer control unit 226 proceeds to S610. The dryer control unit 226 decreases the output of the hot air heater in S610 and proceeds to S611. In S611, the dryer control unit 226 determines whether or not a temperature control count is equal to or more than N. Here, for example, N is, but is not particularly limited to, 10. The purpose of this determination is to extract the possibility of a malfunction in the hot air heater because the hot air heater may have a malfunction if the hot air temperature Tair [° C.] does not reach the target temperature Tta [° C.] even though a command to change the output of the hot air heater is issued. If determining that the temperature control count is equal to or more than N, the dryer control unit 226 proceeds to S613. The dryer control unit 226 makes a temperature control error notification in S613 and proceeds to S615. On the other hand, if determining that the temperature control count is less than N, the dryer control unit 226 returns to S604.

Effects of First Embodiment

With the foregoing structure, if a temperature rise of the fan 304, which serves as the air blower unit, is presumed, the flow rate of the fan 304 itself is controlled to increase a ventilation rate within the dryer module A 120. This operation makes it possible to perform control to keep the temperature of the fan 304 from reaching its heat-resistant temperature. Therefore, with the heat-resistant temperature of the fan 304 taken into consideration, it is also possible to perform control to raise the hot air temperature to a temperature equal to or higher than the heat-resistant temperature of the fan 304. An increase in the ventilation rate leads to a decrease in the hot air temperature. For this reason, if the heat-resistant temperature of the fan 304 is taken into consideration, the productivity of the printing apparatus 1 may decrease due to a drop in the hot air temperature. In other words, taking into consideration the heat-resistant temperature of each of various components such as a bearing that supports the shaft of the fan 304 and increasing the hot air temperature are trade-offs in terms of the productivity of the printing apparatus 1. Therefore, feedback control of the hot air temperature is performed by an operation using the heater module 302. This operation makes it possible to maintain the productivity of the dryer unit 108 at a high level by raising the hot air temperature as high as possible. In this example, the temperature of hot air flowing in the guide duct 305*c* which is one of the constituent elements of the hot air circulation path 500 is detected by the temperature sensor 303, and the temperature of the fan 304 can be predicted based on the above detection result and the temperature profile. Here, the temperature of the fan 304 may be directly detected with a temperature measurement unit such as a thermistor added to the fan 304 itself. In another possible structure, the temperature of hot air flowing in the heating duct 305*b* is detected by the temperature sensor and the temperature of the fan 304 is predicted based on the above detection result and the temperature profile. In addition, in a case where hot air is continuously supplied to the continuous print sheet S, the hot air circulation path 500 rises in temperature, and therefore the control board and the motor (not illustrated) that rotates and drives the fan 304 also rise in temperature. In a case of a structure in which the control to increase the volume of outside air flowing into the fan 304 as in the present embodiment is not performed, it is necessary to provide multiple blowers configured to isolate the control board and the motor (not illustrated) that rotates and drives the fan 304 from the hot air circulation path 500. Such blowers also require additional facilities such as wiring to be connected to the apparatus main body, which results in the overall apparatus becoming larger in size than in the case where the fan 304 is provided as in the present embodiment. In contrast, in the present embodiment, the control to increase the volume of outside air flowing into the fan 304 is performed, so that it is unnecessary to provide such blowers. Therefore, the overall apparatus may be downsized.

Second Embodiment

Next, a second embodiment will be described. In the following description, since the overall structure of the printing apparatus 1 is the same as that of the first embodiment, the same constituent elements as those in the first embodiment will be given the same reference signs in the drawings to refer to the first embodiment and explanations thereof will be omitted as appropriate. In the first embodiment, the printing apparatus is configured to, in the case where the temperature of the fan 304 serving as the air blower unit rises and nearly reaches the limit temperature, perform the control to increase the rotation speed of the fan 304, thereby increasing the intake volume of outside air and accordingly lowering the temperature of the fan 304 itself. In contrast, the present embodiment will provide description in which a structure of promoting intake of outside air is provided to the intake port 307 and, if the temperature of the fan 304 rises, control to lower the temperature of the fan 304 is performed by using the structure of promoting intake of outside air provided to the intake port 307.

Figure 7:
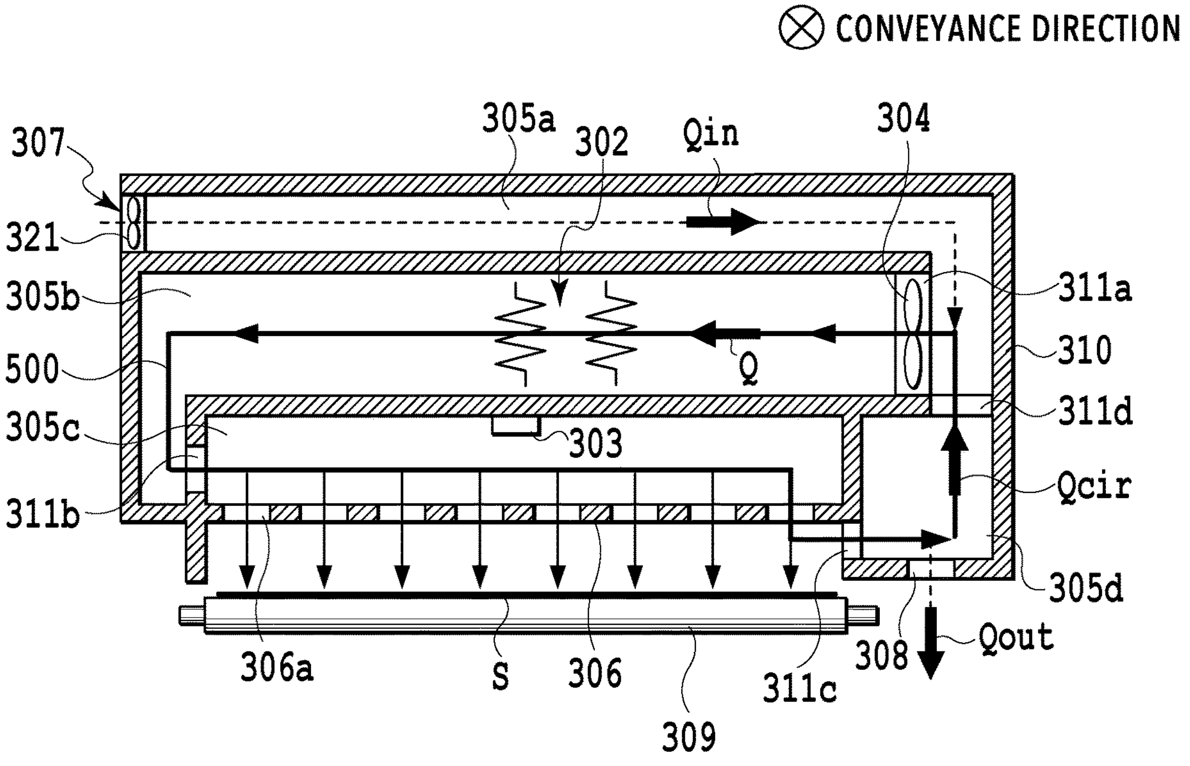
FIG. 7 is a cross-sectional view of a dryer module.

FIG. 7 is a cross-sectional view of the dryer module A 120. As illustrated in FIG. 7, a ventilation fan 321 is further provided to the intake port 307. A flow rate of air blown by the fan 304 is denoted by Q [$m^3$/min]. In FIG. 7, hot air, which is heated outside air, moves along the hot air circulation path 500. The hot air at a flow rate Qout [$m^3$/min] is discharged through the exhaust port 308. The hot air at a flow rate Qcir [$m^3$/min] is returned to the fan 304. Then, outside air taken in by the ventilation fan 321 through the intake port 307 at a flow rate Qin [$m^3$/min] is mixed with the hot air at the flow rate Qcir. As a result, if small losses in the system of the hot air circulation path 500 are ignored, the flow rates generally have the relationship defined by (Formula 1) as in the first embodiment.

With this structure, it is possible to suppress the temperature rise of the fan 304 even by an operation of increasing the intake volume of outside air by the ventilation fan 321 without changing the flow rate Q of the fan 304 serving as the air blower unit. In addition, it is also possible to suppress the temperature rise of the fan 304 by changing the total flow rate of the fan 304 and the ventilation fan 321. Then, if the hot air temperature is raised within the range below the heat-resistant temperature of the fan 304 to enhance the drying efficiency, the temperature sensor 303 does not necessarily have to be provided to the fan 304 as in the first embodiment. For example, the temperature of the fan 304 can be predicted based on the temperature profile and a detection result by the temperature sensor 303. If the hot air temperature falls below the desired range, the hot air temperature can be raised again by feedback control to increase the output of the heater module 302.

Figure 8:
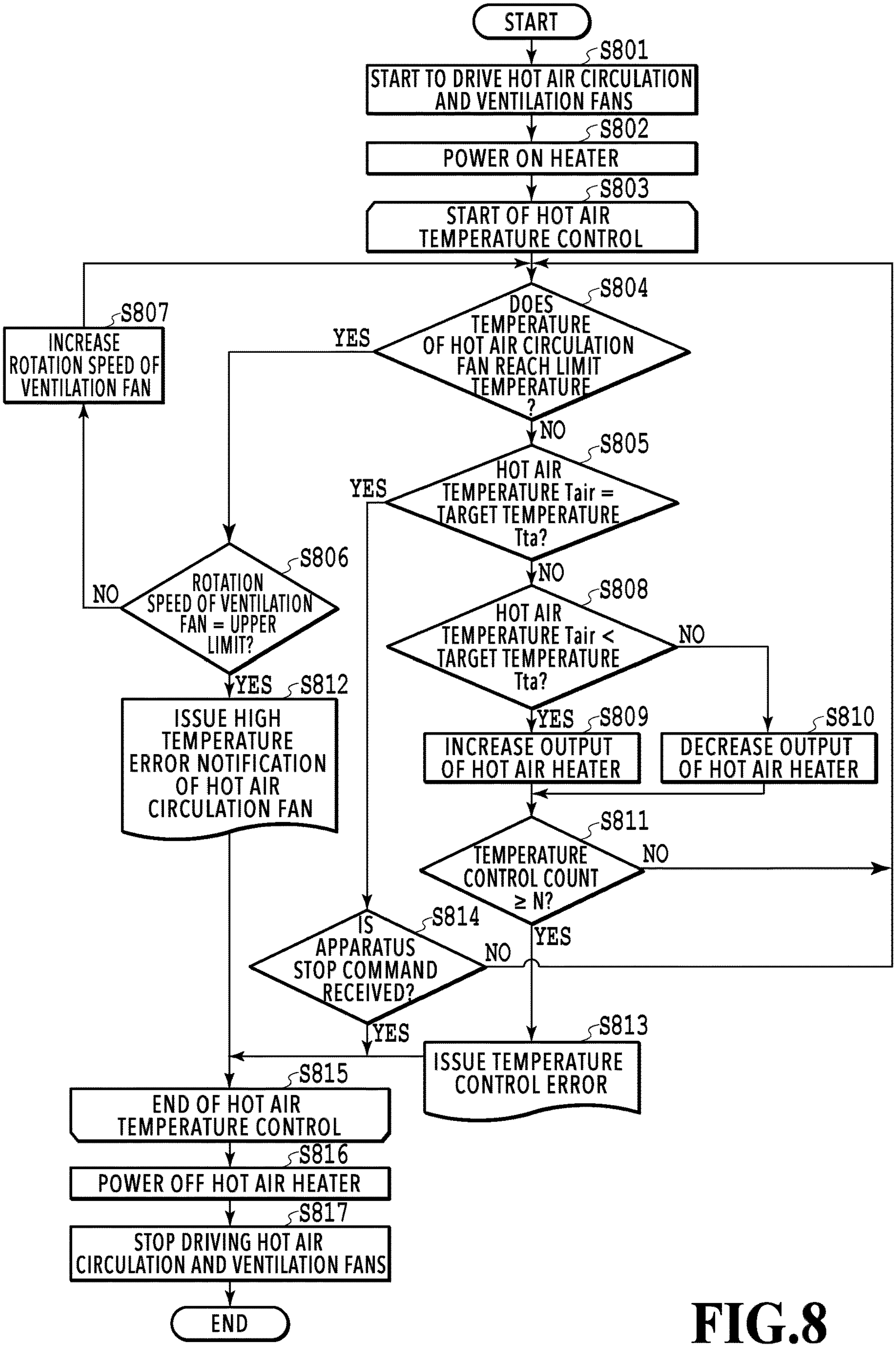
FIG. 8 is a flowchart for explaining temperature rise suppression processing.

FIG. 8 is a flowchart for explaining temperature rise suppression processing. Here, only differences from the flowchart in FIG. 6 will be described. In S801, the dryer control unit 226 starts to drive the hot air circulation fan and the ventilation fan 321. In S804, the dryer control unit 226 determines whether or not the temperature of the hot air circulation fan reaches the limit temperature. If determining that the temperature of the hot air circulation fan reaches the limit temperature, the dryer control unit 226 proceeds to S806. If determining that the temperature of the hot air circulation fan does not reach the limit temperature, the dryer control unit 226 proceeds to S805.

Control of Ventilation Fan 321

In S806, the dryer control unit 226 determines whether or not the rotation speed of the ventilation fan 321 is equal to the upper limit. If determining that the rotation speed of the ventilation fan 321 is equal to the upper limit, the dryer control unit 226 proceeds to S812. If determining that the rotation speed of the ventilation fan 321 is not equal to the upper limit, the dryer control unit 226 proceeds to S807. The dryer control unit 226 increases the rotation speed of the ventilation fan 321 in S807 and returns to S804. On the other hand, the dryer control unit 226 makes a high temperature error notification of the hot air circulation fan in S812 and proceeds to S815. The dryer control unit 226 terminates the hot air temperature control in S815 and proceeds to S816. The dryer control unit 226 turns the heater module 302 to the OFF state in S816 and proceeds to S817. The dryer control unit 226 stops driving the hot air circulation fan and the ventilation fan 321 in S817 and terminates the processing.

Effects of Second Embodiment

With the foregoing structure, if a temperature rise of the fan 304, which serves as the air blower unit, is presumed, the flow rate of the ventilation fan 321 is controlled to increase the ventilation rate within the dryer module A 120. This operation also makes it possible to perform control to keep the temperature of the fan 304 from reaching its heat-resistant temperature. Therefore, with the heat-resistant temperature of the fan 304 taken into consideration, it is also possible to perform control to raise the hot air temperature to a temperature equal to or higher than the heat-resistant temperature of the fan 304.

Third Embodiment

Next, a third embodiment will be described. In the following description, since the overall structure of the printing apparatus 1 is the same as that of the first and second embodiments, the same constituent elements as those in the first and second embodiments will be given the same reference signs in the drawings to refer to the first and second embodiments and explanations thereof will be omitted as appropriate. In the first embodiment, the printing apparatus is configured to, in the case where the temperature of the fan 304 serving as the air blower unit rises and nearly reaches the limit temperature, perform the control to increase the rotation speed of the fan 304, thereby increasing the intake volume of outside air and accordingly lowering the temperature of the fan 304 itself. In the second embodiment, the printing apparatus is configured to, in the case where the temperature of the fan 304 serving as the air blower unit rises and nearly reaches the limit temperature, perform the control to increase the rotation speed of the ventilation fan 321 to increase the intake volume of outside air and thereby lower the temperature of the fan 304. In contrast to these, the present embodiment will provide description in which a structure of promoting discharge of heated outside air is provided to the exhaust port 308, and if the temperature of the fan 304 rises, control to lower the temperature of the fan 304 is performed by using the structure of promoting discharge of heated outside air provided to the exhaust port 308.

Figure 9:
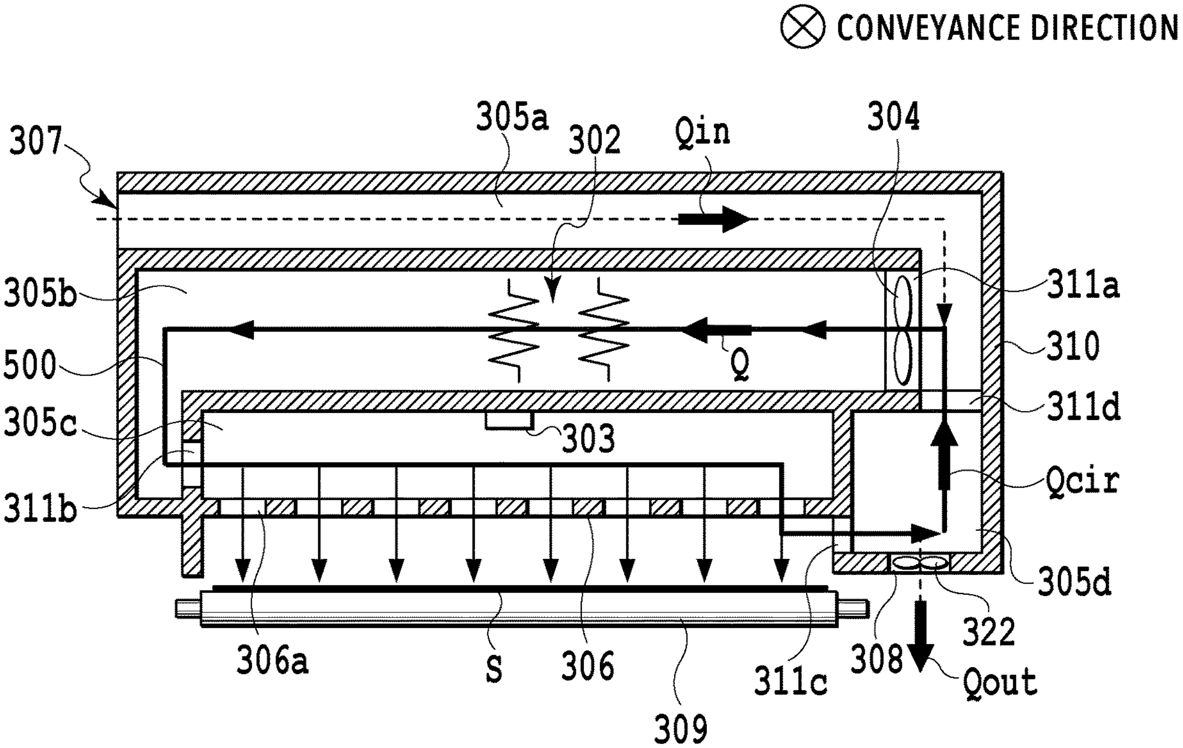
FIG. 9 is a cross-sectional view of a dryer module.

FIG. 9 is a cross-sectional view of the dryer module A 120. As illustrated in FIG. 9, an exhaust fan 322 is further provided to the exhaust port 308. A flow rate of air blown by the fan 304 is denoted by Q [$m^3$/min]. In FIG. 9, hot air, which is heated outside air, moves along the hot air circulation path 500. The hot air at a flow rate Qout [$m^3$/min] is discharged through the exhaust port 308 by the exhaust fan 322. The hot air at a flow rate Qcir [$m^3$/min] is returned to the fan 304. Then, outside air taken in by the fan 304 through the intake port 307 at a flow rate Qin [$m^3$/min] is mixed with the hot air at the flow rate Qcir. As a result, if small losses in the system of the hot air circulation path 500 are ignored, the flow rates generally have the relationship defined by (Formula 1) as in the first embodiment.

With this structure, it is possible to suppress the temperature rise of the fan 304 even by an operation of indirectly increasing the intake volume of outside air by the exhaust fan 322 without changing the flow rate Q of the fan 304 serving as the air blower unit. In addition, it is also possible to suppress the temperature rise of the fan 304 by changing the total flow rate of the fan 304 and the exhaust fan 322. Then, if the hot air temperature is raised within the range below the heat-resistant temperature of the fan 304 to enhance the drying efficiency, the temperature sensor 303 does not necessarily have to be provided to the fan 304 as in the first embodiment. For example, the temperature of the fan 304 can be predicted based on the temperature profile and a detection result by the temperature sensor 303. If the hot air temperature falls below the desired range, the hot air temperature can be raised again by feedback control to increase the output of the heater module 302.

Figure 10:
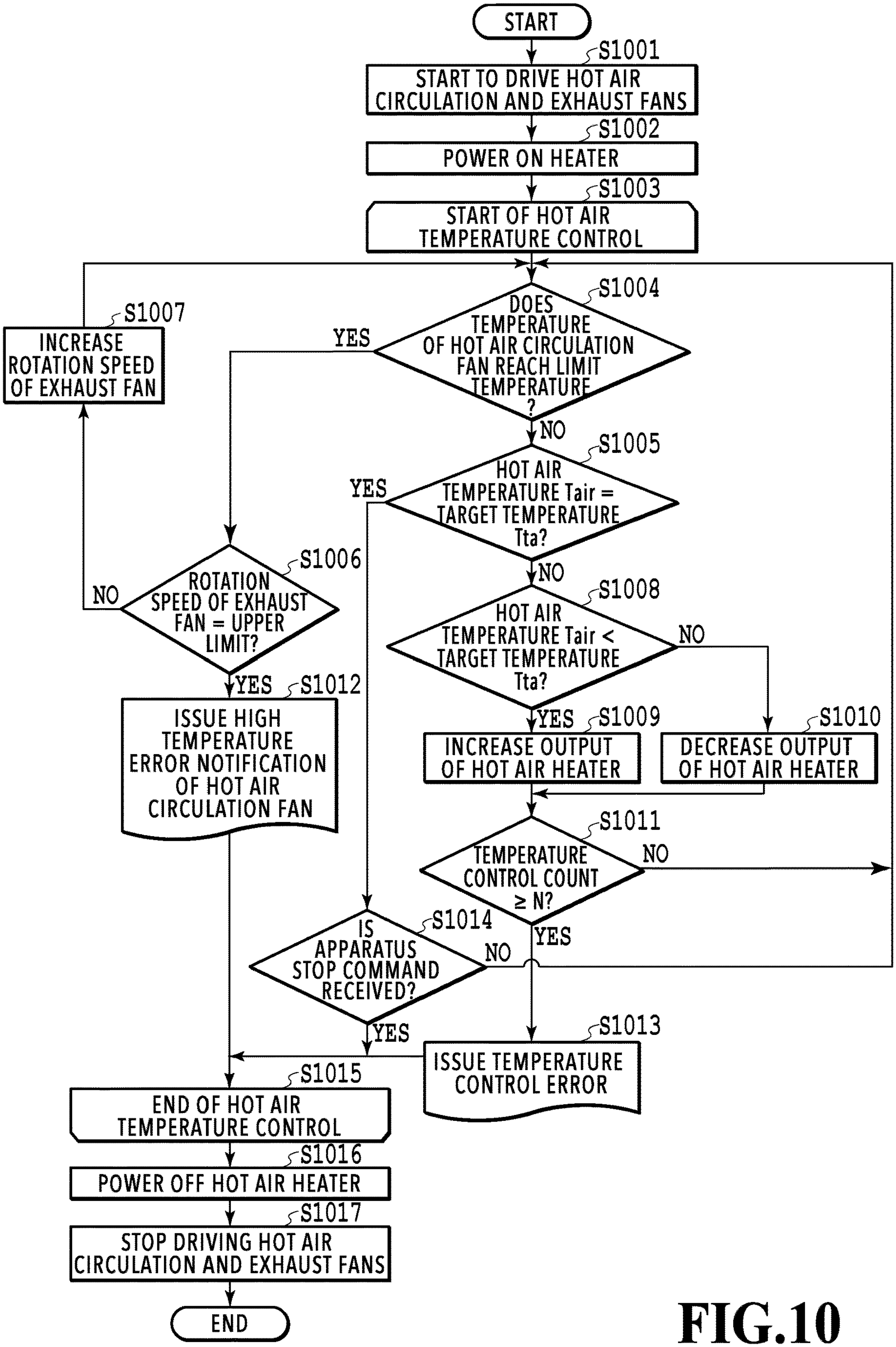
FIG. 10 is a flowchart for explaining temperature rise suppression processing.

FIG. 10 is a flowchart for explaining temperature rise suppression processing. Here, only differences from the flowchart in FIG. 6 will be described. In S1001, the dryer control unit 226 starts to drive the hot air circulation fan and the exhaust fan 322. In S1004, the dryer control unit 226 determines whether or not the temperature of the hot air circulation fan reaches the limit temperature. If determining that the temperature of the hot air circulation fan reaches the limit temperature, the dryer control unit 226 proceeds to S1006. If determining that the temperature of the hot air circulation fan does not reach the limit temperature, the dryer control unit 226 proceeds to S1005.

Control of Exhaust fan 322

In S1006, the dryer control unit 226 determines whether or not the rotation speed of the exhaust fan 322 is equal to the upper limit. If determining that the rotation speed of the exhaust fan 322 is equal to the upper limit, the dryer control unit 226 proceeds to S1012. If determining that the rotation speed of the exhaust fan 322 is not equal to the upper limit, the dryer control unit 226 proceeds to S1007. The dryer control unit 226 increases the rotation speed of the exhaust fan 322 in S1007 and returns to S1004. On the other hand, the dryer control unit 226 makes a high temperature error notification of the hot air circulation fan in S1012 and proceeds to S1015. The dryer control unit 226 terminates the hot air temperature control in S1015 and proceeds to S1016. The dryer control unit 226 turns the heater module 302 to the OFF state in S1016 and proceeds to S1017. The dryer control unit 226 stops driving the hot air circulation fan and the exhaust fan 322 in S1017 and terminates the processing.

Effects of Third Embodiment

With the foregoing structure, if a temperature rise of the fan 304, which serves as the air blower unit, is presumed, the flow rate of the exhaust fan 322 is controlled to indirectly increase the ventilation rate within the dryer module A 120. This operation also makes it possible to perform control to keep the temperature of the fan 304 from reaching its heat-resistant temperature. Therefore, with the heat-resistant temperature of the fan 304 taken into consideration, it is also possible to perform control to raise the hot air temperature to a temperature equal to or higher than the heat-resistant temperature of the fan 304.

Fourth Embodiment

Next, a fourth embodiment will be described. In the following description, since the overall structure of the printing apparatus 1 is the same as that of the first to third embodiments, the same constituent elements as those in the first to third embodiments will be given the same reference signs in the drawings to refer to the first to third embodiments and explanations thereof will be omitted as appropriate. In the first embodiment, the printing apparatus is configured to, in the case where the temperature of the fan 304 serving as the air blower unit rises and nearly reaches the limit temperature, perform the control to increase the rotation speed of the fan 304, thereby increasing the intake volume of outside air and accordingly lowering the temperature of the fan 304 itself. In the second embodiment, the printing apparatus is configured to, in the case where the temperature of the fan 304 serving as the air blower unit rises and nearly reaches the limit temperature, perform the control to increase the rotation speed of the ventilation fan 321 to increase the intake volume of outside air and thereby lower the temperature of the fan 304. In the third embodiment, the printing apparatus is configured to, in the case where the temperature of the fan 304 serving as the air blower unit rises and nearly reaches the limit temperature, perform the control to increase the rotation speed of the exhaust fan 322, thereby increasing the intake volume of outside air and accordingly lowering the temperature of the fan 304. In contrast to these, the present embodiment will describe a ventilation volume control configuration using a structure in which a valve unit is provided to the intake duct 305*a* and controls the intake volume of outside air.

Figure 11A:
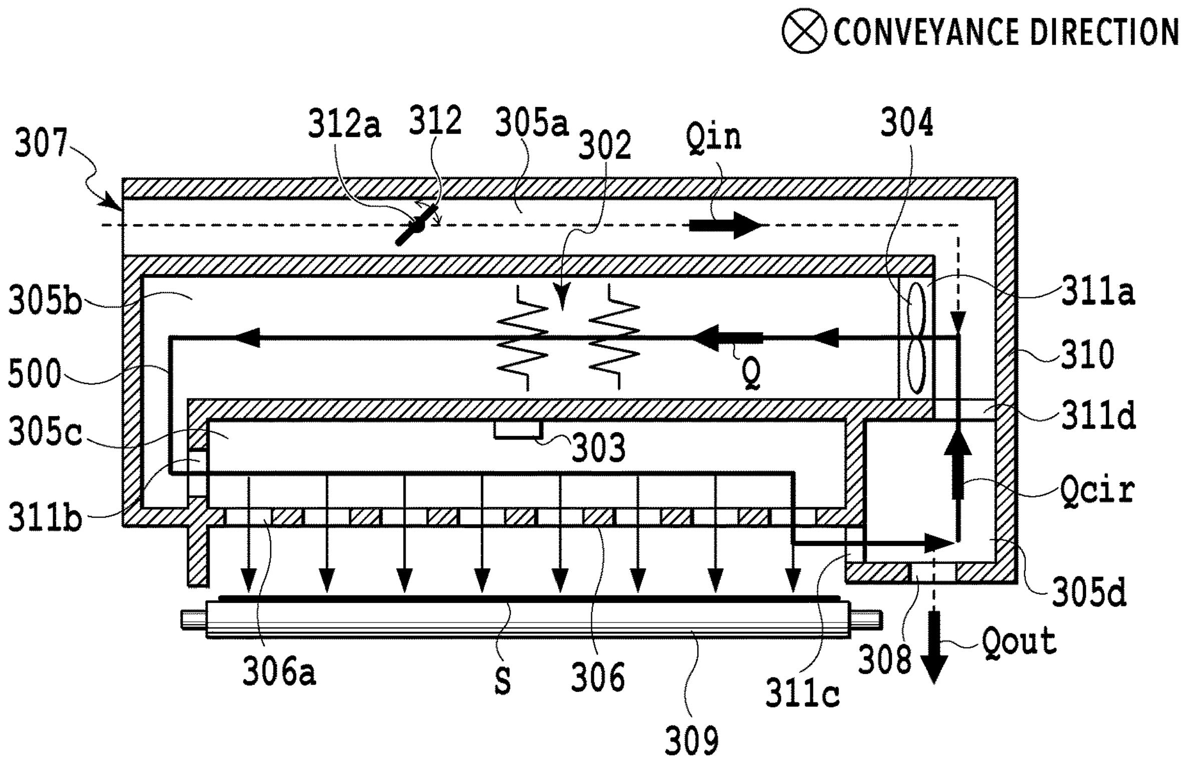
FIGS. 11A and 11B are cross-sectional views of dryer modules.
Figure 11B:
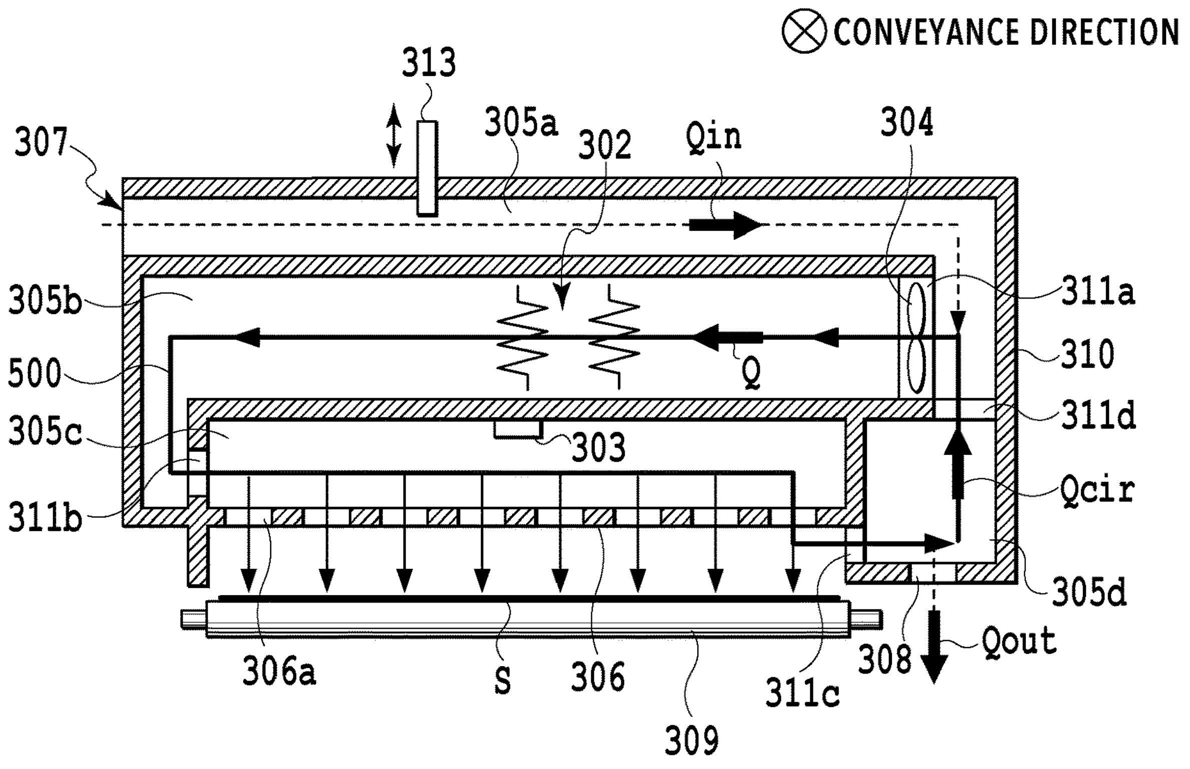

FIGS. 11A and 11B are cross-sectional views of the dryer module A 120. FIG. 11A is the view illustrating an example in which a butterfly valve 312 as the valve unit is provided to the intake duct 305*a*. The butterfly valve 312 has a ventilation volume control function of adjusting an opening degree of an opening cross-sectional area of the air passage constituted by the intake duct 305*a* and thereby controlling a pressure loss inside the intake duct 305*a*. The butterfly valve 312 is rotatable at a desired angle by a driving unit not illustrated (such as a stepping motor) provided to a rotation center 312*a*. In FIG. 11A, the opening degree of the butterfly valve 312 at an initial state is 0%. Before the temperature of the fan 304 reaches the limit temperature, the opening degree of the butterfly valve 312 is increased to adjust the opening degree of the opening cross-sectional area of the air passage constituted by the intake duct 305*a*. This operation makes it possible to increase the intake volume of outside air, in other words, the ventilation volume by reducing the pressure loss in the intake duct 305*a*. Therefore, the temperature rise of the fan 304 can be suppressed. In an operation in the present mode, only the control for the fan 304, the ventilation fan 321, and the exhaust fan 322 in the first to third embodiments is replaced with the adjustment of the opening degree of the butterfly valve 312, and therefore the description thereof is omitted herein.

FIG. 11B is the view illustrating an example in which a slide-type valve 313 as the valve unit is provided to the intake duct 305*a*. The valve 313 has a ventilation volume control function of adjusting the opening degree of the opening cross-sectional area of the air passage constituted by the intake duct 305*a* and thereby controlling a pressure loss inside the intake duct 305*a*. The valve 313 slides in an up-down direction of the page in FIG. 11 to control the pressure loss inside the intake duct 305*a*. The valve 313 is configured to slide along with a movement of a mechanism such as a cam or a lack-and-pinion by a driving unit not illustrated. In FIG. 11B, the opening degree of the valve 313 at an initial state is 0%. Before the temperature of the fan 304 reaches the limit temperature, the opening degree of the valve 313 is increased to adjust the opening degree of the opening cross-sectional area of the air passage constituted by the intake duct 305*a*. This operation makes it possible to increase the ventilation volume by reducing the pressure loss in the intake duct 305*a*. Therefore, the temperature rise of the fan 304 can be suppressed. In an operation in the present mode, only the control for the fan 304, the ventilation fan 321, and the exhaust fan 322 in the first to third embodiments is replaced with the adjustment of the opening degree of the valve 313, and therefore the description thereof is omitted herein.

Effects of Fourth Embodiment

With the foregoing structure, if a temperature rise of the fan 304, which serves as the air blower unit, is presumed, the valve unit controls the volume of outside air flowing into the fan 304 to thereby increase the ventilation rate within the dryer module A 120. This operation also makes it possible to perform control to keep the temperature of the fan 304 from reaching its heat-resistant temperature. Therefore, with the heat-resistant temperature of the fan 304 taken into consideration, it is also possible to perform control to raise the hot air temperature to a temperature equal to or higher than the heat-resistant temperature of the fan 304.

Fifth Embodiment

Next, a fifth embodiment will be described. In the following description, since the overall structure of the printing apparatus 1 is the same as that of the first to fourth embodiments, the same constituent elements as those in the first to fourth embodiments will be given the same reference signs in the drawings to refer to the first to fourth embodiments and explanations thereof will be omitted as appropriate.

Figure 12:
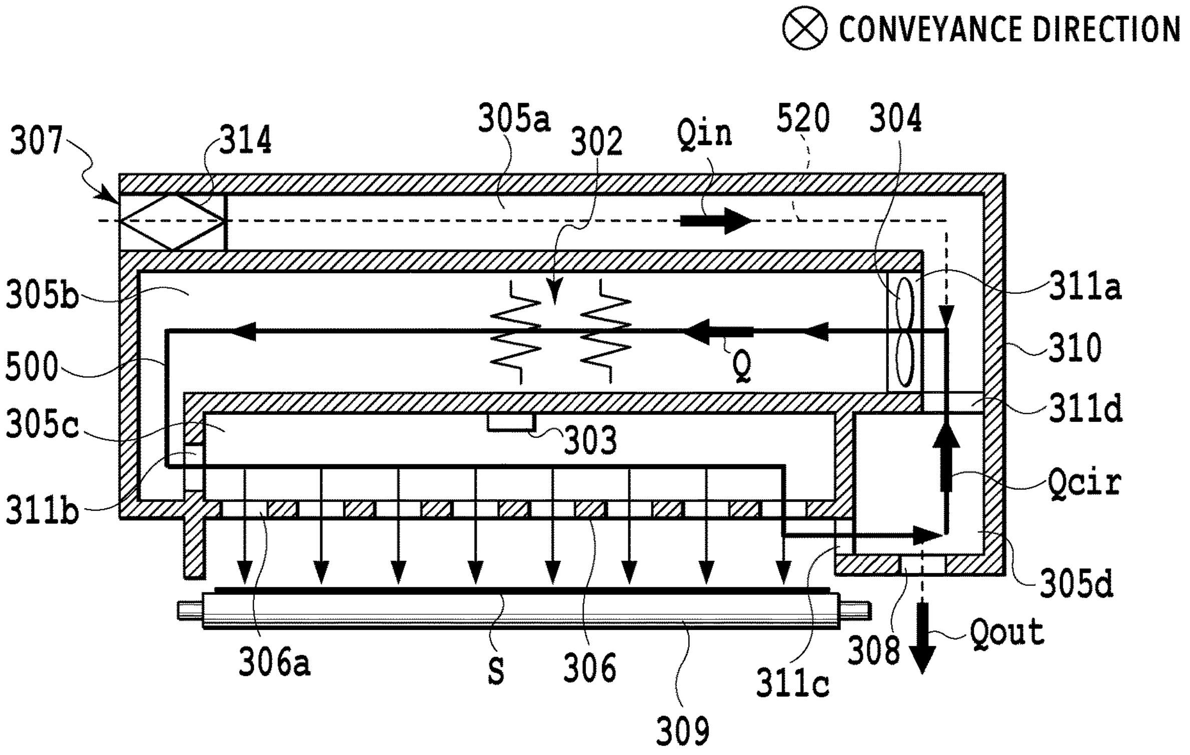
FIG. 12 is a cross-sectional view of a dryer module.

FIG. 12 is a cross-sectional view of the dryer module A 120. As illustrated in FIG. 12, a heat exchanger 314 is further provided to the intake port 307. The heat exchanger 314 has a function to further lower the temperature of outside air taken in through the intake port 307. Therefore, the temperature of outside air after passing through the heat exchanger 314 is further lowered, which is effective in suppressing a temperature rise of the fan 304. Specifically, this operation has the same meaning as a decrease in the outside air temperature Tout in (Formula 2) in the first embodiment by the heat exchanger 314, and therefore makes it possible to reduce the flow rate change $\Delta Q$ required to lower the temperature of the fan 304. Even in the case where the fan 304 already operates at a quite high duty cycle and has only little room to increase the rotation speed to increase the ventilation volume, this structure enables the following operation. Specifically, the temperature rise of the fan 304 can be suppressed by lowering the outside air temperature Tout by the heat exchanger 314 and by controlling the flow rate of the outside air taken in by the fan 304. In addition, the same effects can be obtained by combining the ventilation fan 321 in the second embodiment, the exhaust fan 322 in the third embodiment, and the heat exchanger 314 in the present embodiment.

Effects of Fifth Embodiment

With the foregoing structure, the dryer module A 120, the dryer module B 130, the dryer module C 140, and the dryer module D 150 in the dryer unit 108 achieve the following matters in the hot air circulation path 500. Specifically, outside air having a temperature made lower than the hot air temperature is taken in based on a detection result by the temperature sensor 303. This operation makes it possible to perform control to keep the temperature of the fan 304 from reaching its heat-resistant temperature. Therefore, with the heat-resistant temperature of the fan 304 taken into consideration, it is also possible to perform control to raise the hot air temperature to a temperature equal to or higher than the heat-resistant temperature of the fan 304.

Other Embodiments

The foregoing embodiments are described based on the example in which the cooler unit 111 is provided at a subsequent stage of the dryer unit 108. However, an embodiment is not limited to this example. A decurling unit configured to reduce curling of a continuous print sheet may be provided between the dryer unit 108 and the cooler unit 111. The embodiments are described based on the structure example assuming single-sided printing, but an embodiment is not limited to this example. For example, a reversing unit configured to reverse a continuous print sheet may be provided on the print sheet conveyance path P. Since such a reversing unit can turn a continuous print sheet upside down, double-sided printing can be performed.

The embodiments are described based on the example in which the fan 304 is formed of an axial fan. However, an embodiment is not limited to this example. The fan 304 may be formed of a sirocco fan. Specifically, in the case where the fan 304 is formed by the axial fan as in the embodiments, the frame body 310 must have a structure configured to generate an air flow in the direction along the rotation axis of the fan 304. Therefore, such a constraint that the positive pressure side of the fan 304 and the heater module 302 must be arranged to face each other is imposed on the layout structure. In contrast, in the case where the fan 304 is formed of the sirocco fan, the sirocco fan generates a swirling flow perpendicular to its rotation axis and straightens the swirling flow in one direction. Thus, the pressure of the air flow blown is increased. This allows a greater freedom of the structure of the frame body 310 and also makes it possible to apply a stronger air flow. Therefore, the frame body 310 may be downsized and the productivity may be also enhanced. Specifically, the sirocco fan draws air in through a cylindrical runner and generates a swirling flow. For this reason, if the intake port 307 is provided on the rotation axis of the sirocco fan, the intake duct 305*a* and the heating duct 305*b* can be formed to have the same height. Since the sirocco fan is configured to generate a swirling flow in the direction perpendicular to its rotation axis, the heater module 302 does not have to be arranged in the rotation axis direction of the sirocco fan. In other words, the rotation axis of the sirocco fan does not have to point to the heater module 302, and therefore the freedom of the layout structure can be also enhanced. Therefore, the size of the frame body 310 in the height direction can be reduced, and accordingly the frame body 310 can be downsized. Since the sirocco fan can blow a stronger air flow, it is possible to achieve a higher cooling effect and higher productivity.

The embodiments are described based on the example in which the outside air flows from the upper side to the lower side inside the dryer unit 108. However, an embodiment is not limited to this example. The outside air may flow from the lower side to the upper side or may flow from a lateral side to the lower side.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-149835, filed Sep. 15, 2023, which is hereby incorporated by reference wherein in its entirety.

What is claimed is:

1. A printing apparatus comprising:

an image formation unit configured to form an image on a print sheet;

a dryer unit provided on a subsequent stage side of the image formation unit and configured to dry the print sheet on which the image is formed by the image formation unit; and a controller unit configured to control an operation of the dryer unit, wherein the dryer unit includes:

(1) an intake port configured to take in outside air;

(2) a heater unit configured to heat the outside air taken in through the intake port;

(3) an air blower unit configured to perform an air blowing operation of blowing heated outside air in a certain direction, the heated outside air being the outside air heated by the heater unit;

(4) a return port configured to allow an inflow of part of the heated outside air blown to the print sheet; and (5) a temperature detector unit provided inside the dryer unit and configured to detect a temperature inside the dryer unit, wherein in a case where the air blower unit performs the air blowing operation, the part of the heated outside air flowing in through the return port and the outside air flowing in through the intake port flow into the air blower unit, wherein in a case where the temperature detected by the temperature detector unit is equal to or higher than a first temperature, the controller unit controls the air blowing operation to increase a volume of the outside air flowing into the air blower unit, wherein in a case where the temperature is lower than the first temperature and is equal to or higher than a second temperature lower than the first temperature, the controller unit performs control to decrease an output of the heater unit, wherein in a case where the temperature is lower than the second temperature, the controller unit performs control to increase the output of the heater unit, and wherein the first temperature is a temperature of a measurement target with which a temperature of the air blower unit reaches an upper limit of its heat-resistant temperature.

2. The printing apparatus according to claim 1, wherein a downstream side of a return duct including the return port and an upstream side of the air blower unit are connected to a downstream side of an intake duct including the intake port.

3. The printing apparatus according to claim 2, wherein the dryer unit further includes a heating duct in which the heater unit and the air blower unit are housed, and wherein in the heating duct, the air blower unit is arranged upstream of the heater unit.

4. The printing apparatus according to claim 3, further comprising a guide duct configured to guide the heated outside air blown by the air blower unit toward the print sheet, wherein while the air blower unit is performing the air blowing operation, part of the heated outside air is circulated in order of a downstream side of the intake duct, the heating duct, the guide duct, and the return duct.

5. The printing apparatus according to claim 3, wherein a measurement target of the temperature detector unit comprises the heating duct.

6. The printing apparatus according to claim 1, wherein a plurality of the dryer units are arranged along a conveyance direction of the print sheet.

7. The printing apparatus according to claim 1, further comprising a guide duct configured to guide the heated outside air blown by the air blower unit toward the print sheet, wherein a measurement target of the temperature detector unit is heated outside air flowing inside the guide duct.

8. The printing apparatus according to claim 1, wherein a measurement target of the temperature detector unit comprises the air blower unit.

9. The printing apparatus according to claim 1, wherein a measurement target of the temperature detector unit comprises the print sheet.

10. The printing apparatus according to claim 1, wherein a measurement target of the temperature detector unit comprises a frame body constituting the dryer unit, and wherein a material for the frame body comprises a metal.

11. The printing apparatus according to claim 1, wherein the dryer unit further includes a ventilation fan provided on an upstream side of an intake duct including the intake port, the ventilation fan configured to take in the outside air, and wherein in the case where the temperature is equal to or higher than the first temperature, the controller unit controls driving of the ventilation fan.

12. The printing apparatus according to claim 1, wherein the dryer unit further includes an adjustment unit provided to an intake duct including the intake port, the adjustment unit configured to adjust a flow rate of the outside air, and wherein in the case where the temperature is equal to or higher than the first temperature, the controller unit adjusts the adjustment unit.

13. The printing apparatus according to claim 1, wherein the dryer unit further includes an exhaust fan provided to a return duct including the return port, the exhaust fan configured to discharge the other part of the heated outside air to outside, and wherein in the case where the temperature is equal to or higher than the first temperature, the controller unit controls a flow rate of the exhaust fan.

14. The printing apparatus according to claim 1, wherein the dryer unit further includes a heat exchanger provided on an upstream side of an intake duct including the intake port, the heat exchanger being configured to be capable of exchanging heat with the outside air.

15. The printing apparatus according to claim 1, wherein the controller unit controls an amount of heat generated by the heater unit so that the temperature becomes a target temperature inside the dryer unit.

16. The printing apparatus according to claim 1, wherein the controller unit increases or decreases an output of the heater unit so that the temperature becomes a target temperature inside the dryer unit.

17. The printing apparatus according to claim 1, wherein the controller unit controls a temperature of the air blower unit based on a temperature prediction of the air blower unit according to the temperature detected by the temperature detector unit.

18. The printing apparatus according to claim 1, wherein the second temperature is a temperature of a measurement target with which a temperature of the heated outside air reaches its target temperature.

19. A printing method for a printing apparatus, the printing apparatus including (1) an image formation unit configured to form an image on a print sheet and (2) a dryer unit provided on a subsequent stage side of the image formation unit and configured to dry the print sheet on which the image is formed by the image formation unit, the method comprising:

a step of controlling an operation of the dryer unit, wherein the dryer unit includes (1) an intake port configured to take in outside air, (2) a heater unit configured to heat the outside air taken in through the intake port, (3) an air blower unit configured to perform an air blowing operation of blowing heated outside air in a certain direction, the heated outside air being the outside air heated by the heater unit, (4) a return port configured to allow an inflow of part of the heated outside air blown to the print sheet, and (5) a temperature detector unit provided inside the dryer unit and configured to detect a temperature inside the dryer unit, wherein in a case where the air blower unit performs the air blowing operation, the part of the heated outside air flowing in through the return port and the outside air flowing in through the intake port flow into the air blower unit, wherein the controlling includes:

(1) a step of, in a case where the temperature detected by the temperature detector unit is equal to or higher than a first temperature, controlling the air blowing operation to increase a volume of the outside air flowing into the air blower unit, (2) a step of, in a case where the temperature is lower than the first temperature and is equal to or higher than a second temperature lower than the first temperature, performing control to decrease an output of the heater unit, and (3) a step of, in a case where the temperature is lower than the second temperature, performing control to increase the output of the heater unit, and wherein the first temperature is a temperature of a measurement target with which a temperature of the air blower unit reaches an upper limit of its heat-resistant temperature.

* * * * *